(12) United States Patent
Yoshimoto et al.

(10) Patent No.: US 11,424,874 B2
(45) Date of Patent: Aug. 23, 2022

(54) BASE STATION APPARATUS, TERMINAL APPARATUS, AND COMMUNICATION METHOD FOR BASE STATION APPARATUS AND TERMINAL APPARATUS

(71) Applicants: SHARP KABUSHIKI KAISHA, Sakai (JP); FG Innovation Company Limited, Tuen Mun (HK)

(72) Inventors: Takashi Yoshimoto, Sakai (JP); Jungo Goto, Sakai (JP); Osamu Nakamura, Sakai (JP); Yasuhiro Hamaguchi, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/473,760

(22) PCT Filed: Dec. 21, 2017

(86) PCT No.: PCT/JP2017/045984
§ 371 (c)(1),
(2) Date: Jun. 26, 2019

(87) PCT Pub. No.: WO2018/128086
PCT Pub. Date: Jul. 12, 2018

(65) Prior Publication Data
US 2019/0327037 A1    Oct. 24, 2019

(30) Foreign Application Priority Data
Jan. 5, 2017   (JP) .............................. JP2017-000506

(51) Int. Cl.
*H04L 5/00* (2006.01)
*H04W 52/14* (2009.01)
*H04W 72/04* (2009.01)

(52) U.S. Cl.
CPC ........... *H04L 5/001* (2013.01); *H04W 52/146* (2013.01); *H04W 72/042* (2013.01); *H04W 72/0453* (2013.01)

(58) Field of Classification Search
CPC .. H04L 5/001; H04W 52/146; H04W 72/042; H04W 72/0453
(Continued)

(56) References Cited

U.S. PATENT DOCUMENTS

2010/0029289 A1*  2/2010  Love ..................... H04L 5/0041
                                                          455/450
2014/0254544 A1*  9/2014  Kar Kin Au ........ H04L 27/2613
                                                          370/330
(Continued)

FOREIGN PATENT DOCUMENTS

| EP | 3413640 A1 | 12/2018 |
| WO | 2017/196387 A1 | 11/2017 |
| WO | 2018/064009 A1 | 4/2018 |

OTHER PUBLICATIONS

3rd Generation Partnership Project; Technical Specification Group Radio AccessNetwork; Study on Scenarios and Requirements for Next Generation Access Technologies; 3GPP TR 38.913 v14.0.0 (Oct. 2016).
(Continued)

*Primary Examiner* — Kwang B Yao
*Assistant Examiner* — Xuan Lu
(74) *Attorney, Agent, or Firm* — ScienBiziP, P.C.

(57) ABSTRACT

A terminal apparatus for communicating with a base station apparatus, the terminal apparatus including: a receiver configured to receive information related to subcarrier spacing for an OFDM signal from the base station apparatus; and a transmitter configured to transmit an uplink data channel to the base station apparatus by using the OFDM signal, based on the information related to the subcarrier spacing. The
(Continued)

transmitter generates the OFDM signal by using a plurality of the subcarrier spacings, and the transmitter configures a transmit power of the uplink data channel, based on the subcarrier spacing of subcarriers to which the uplink data channel has been mapped.

2 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0264683 A1* | 9/2015 | Kim ................ | H04W 72/0446 370/329 |
| 2015/0282178 A1* | 10/2015 | Kim .................... | H04B 7/2656 370/329 |
| 2015/0358983 A1* | 12/2015 | Frenger .............. | H04W 72/085 370/329 |
| 2017/0013565 A1* | 1/2017 | Pelletier ............. | H04W 52/365 |
| 2017/0111930 A1* | 4/2017 | Rajagopal ........... | H04W 74/006 |
| 2018/0049182 A1* | 2/2018 | Luo .................... | H04W 72/048 |
| 2018/0199381 A1* | 7/2018 | Rong .................. | H04W 74/08 |
| 2019/0320337 A1* | 10/2019 | Siomina ............... | H04W 24/10 |

OTHER PUBLICATIONS

Media Tek Iinc., "An RX based interference mitigation method for waveform with multiple numerologies", R1-167529, 3GPP TSG RAN WG1 Meeting #86, Gothenburg, Sweden, Aug. 22-26, 2016.
Huawei et al., "Waveform evaluation results for case 4", R1-166091, 3GPP TSG RAN WG1 Meeting #86, Gothenburg, Sweden, Aug. 22-26, 2016.
Huawei et al., "UL power control for short TTI", R1-1611161, 3GPP TSG RAN WG1 Meeting #87, Reno, USA, Nov. 14-18, 2016.
Intel Corporation, "On PHR for NB-IoT", R4-165061, 3GPP RAN4 #80, Gothenburg, Sweden, Aug. 22-26, 2016.
Zte, "UL power control for NB-IoT", R1-161873, 3GPP TSG RAN WG1 NB-IoT Ad-Hoc Meeting, Sophia Antipolis, France, Mar. 22-24, 2016.
Huawei et al., "RF requirements for HPUE", R4-166322, 3GPP TSG-RAN WG4 Meeting 80 Gothenburg, Sweden, Aug. 22-26, 2016.
Zte et al., "Considerations on NR spectrum utilization and usage of fractional RB", R4-1609662, 3GPP TSG-RAN WG4 Meeting #81 Reno, Nevada, USA, Nov. 14-18, 2016.
Nokia, "NB-IoT SEM Study", R4-162263, TSG-RAN Working Group 4 (Radio) meeting #78bis, San Jose del Cabo, Mexico Apr. 11-15, 2016.
Samsung, "Discussion on numerology support", R1-166754 3GPP TSG RAN WG1 Meeting #86, Gothenburg, Sweden, Aug. 22-26, 2016.

* cited by examiner

BASE STATION APPARATUS, TERMINAL APPARATUS, AND COMMUNICATION METHOD FOR BASE STATION APPARATUS AND TERMINAL APPARATUS

TECHNICAL FIELD

The present invention relates to a base station apparatus, a terminal apparatus, and a communication method thereof.

This application claims priority based on JP 2017-000506 filed on Jan. 5, 2017, the contents of which are incorporated herein by reference.

BACKGROUND ART

In a mobile communication system, such as Long Term Evolution (LTE), which is specified in The Third Generation Partnership Project (3GPP), radio multiple access based on Orthogonal Frequency Division Multiplexing (OFDM) is employed (referred to as Orthogonal Frequency Division Multiple Access (OFDMA)). OFDM can maintain periodicity of signals in a frequency selective fading channel by inserting a Cyclic Prefix (CP). In OFDMA in LTE, since a base station apparatus communicates with the all terminal apparatuses within the cell by using subcarriers including the same subcarrier spacing, orthogonality between the subcarriers is maintained.

In 3GPP, a multiple access of the fifth generation mobile communication system (5G) using OFDMA has also been discussed. In 5G, the standardization of specification of radio multiple access which satisfies the requirements of three use cases is being conducted, including enhanced Mobile Broadband (eMBB) which performs large-capacity communication with high frequency utilization efficiency, massive Machine Type Communication (mMTC) which accommodates multiple stations, and Ultra-Reliable and Low Latency Communication (uRLLC) which realizes high-reliable low latency communication (NPL 1). Thus, in OFDMA in 5G, an OFDM symbol length suitable for each use case is used. For example, an OFDM symbol length used for uRLLC is shortened than the OFDM symbol length used for eMBB to achieve low latency communication. OFDM symbol lengths can be adjusted by changing subcarrier spacings (NPL 2).

CITATION LIST

Non Patent Literature

NPL 1: "3rd Generation Partnership Project; Technical Specification Group Radio Access Network; Study on Scenarios and Requirements for Next Generation Access Technologies;" (Release 14) 3GPP TR 38.913 v14.0.0 (2016-10)

NPL 2: R1-167529, 3GPP TSG RAN WG1 Meeting #86, Gothenburg, Sweden, 22-26 Aug. 2016

SUMMARY OF INVENTION

Technical Problem

However, in OFDM, a side lobe of each subcarrier is different in a case that the subcarrier spacing is different. Different subcarrier spacings may be used depending on frequency bands in which communication is performed. Thus, in radio multiple access in which a base station apparatus and a terminal apparatus communicate using multiple subcarrier spacings, there is a problem that out-of-band radiation or interference given to adjacent channels and the like varies due to subcarrier spacing changing.

One aspect of the present invention is made in view of such circumstances, and a purpose of the present invention is to provide a base station apparatus, a terminal apparatus, and a communication method which can flexibly adjust out-of-band radiation or interference given to adjacent channels and the like due to different subcarrier spacings, in a communication system where the base station apparatus and the terminal apparatus communicate by radio multiple access using multiple subcarrier spacings.

Solution to Problem

To address the above-mentioned drawbacks, a base station apparatus, a terminal apparatus, and a communication method according to an aspect of the present invention are configured as follows.

(1) One aspect of the present invention is a terminal apparatus for communicating with a base station apparatus, the terminal apparatus including: a receiver configured to receive information related to subcarrier spacing for an OFDM signal from the base station apparatus; and a transmitter configured to transmit an uplink data channel to the base station apparatus, by using the OFDM signal, based on the information related to the subcarrier spacing. The transmitter generates the OFDM signal, by using a plurality of the subcarrier spacings, and the transmitter configures a transmit power of the uplink data channel, based on the subcarrier spacing of subcarriers to which the uplink data channel has been mapped.

(2) In one aspect of the present invention, the transmit power of the uplink data channel is configured based on at least a target reception power value and a first correction value determined by the number of resource blocks to which the uplink data channel is mapped, one of the resource blocks is a region of radio resource that is uniquely determined from the subcarriers and OFDM symbols, and the target reception power value is configured based on the subcarrier spacing of the subcarriers included in one of the resource blocks to which the uplink data channel is mapped.

(3) In one aspect of the present invention, in a case that the subcarrier spacing of the subcarriers included in one of the resource blocks to which the uplink data channel is mapped is N times longer than a first subcarrier spacing of the plurality of the subcarrier spacings, the target reception power value is configured to 1/N of the target reception power value in a case that the uplink data channel is mapped to one of the resource blocks in which the subcarriers are allocated at the first subcarrier spacing.

(4) In one aspect of the present invention, the receiver receives downlink control information from the base station apparatus, the transmit power of the uplink data channel is configured based on at least a target reception power value and a first correction value determined by the number of resource blocks to which the uplink data channel is mapped, one of the resource blocks is a region of radio resource that is uniquely determined from the subcarriers and OFDM symbols, the downlink control information includes a transmission power control command for the uplink data channel, and the transmitter has a table for associating the transmission power control command with a second correction value for the transmit power of the uplink data channel, for each of the plurality of the subcarrier spacings.

(5) In one aspect of the present invention, the transmitter maps the uplink data channel to the subcarriers in a plurality of frequency bands, the subcarrier spacing is configured for each of the plurality of frequency bands, and the second correction value is configured to have a variation range of power, based on the subcarrier spacing.

(6) In one aspect of the present invention, in a case that the subcarrier spacing at which the uplink data channel is allocated is changed, the transmitter configures the second correction value to an initial value.

(7) In one aspect of the present invention, the transmitter configures the second correction value, based on reference subcarrier spacing for the target reception power value.

(8) In one aspect of the present invention, wherein the transmitter configures the second correction value, based on reference subcarrier spacing for the first correction value.

(9) In one aspect of the present invention, the transmitter configures the transmit power of the uplink data channel in a range which does not exceed a maximum transmit power, and in a case that the uplink data channel is transmitted by using a minimum subcarrier spacing of the plurality of the subcarrier spacings, a lower limit value of the maximum transmit power is configured to be smaller compared to a case that the uplink data channel is transmitted by using another subcarrier spacing of the plurality of the subcarrier spacings.

(10) In one aspect of the present invention, in a case of changing the subcarrier spacing used for transmission of the uplink data channel, the transmitter transmits a power headroom report to the base station apparatus.

(11) One aspect of the present invention is a communication method for a terminal apparatus for communicating with a base station apparatus, the communication method including the steps of: receiving information related to subcarrier spacing for an OFDM signal from the base station apparatus; and transmitting an uplink data channel to the base station apparatus by using the OFDM signal, based on the information related to the subcarrier spacing, wherein the step of transmitting generates the OFDM signal by using a plurality of the subcarrier spacings, and the step of transmitting configures a transmit power of the uplink data channel, based on the subcarrier spacing of subcarriers to which the uplink data channel is mapped.

Advantageous Effects of Invention

One or more aspects of the present invention can flexibly adjust out-of-band radiation or interference given to adjacent channels and the like due to different subcarrier spacings, in a communication system where the base station apparatus and the terminal apparatus communicate by radio multiple access using multiple subcarrier spacings.

DESCRIPTION OF EMBODIMENTS

Figure 1:
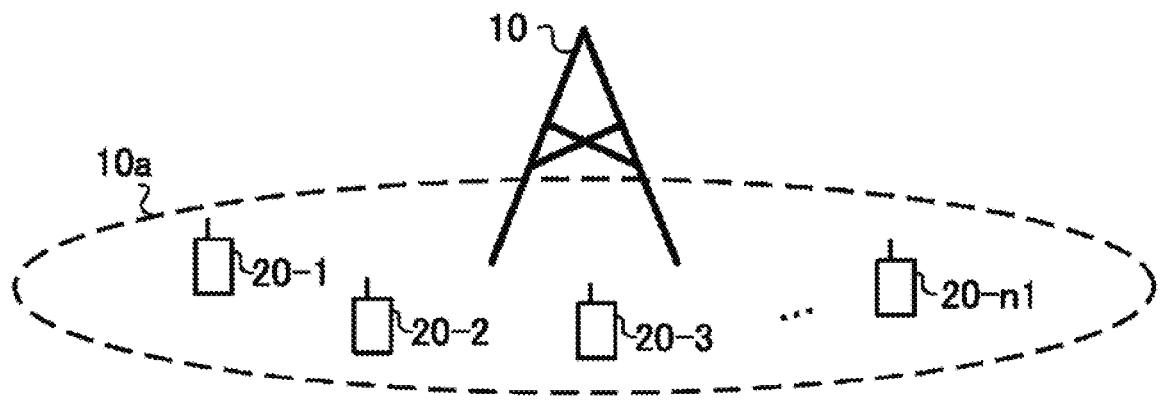
FIG. 1 is a diagram illustrating an example of a configuration of a communication system according to a first embodiment.

The communication system according to the present embodiment includes a base station apparatus (cell, small cell, serving cell, component carrier, eNodeB, Home eNodeB, gNodeB, or access point) and a terminal apparatus (User Equipment (UE), terminal, mobile station, mobile terminal, or subscriber unit). In the communication system, in a case of downlink, the base station apparatus serves as a transmitting apparatus (transmission point, transmit antenna group, or transmit antenna port group), and the terminal apparatus serves as a receiving apparatus (reception point, reception terminal, receive antenna group, or receive antenna port group). In a case of uplink, the base station apparatus serves as a receiving apparatus, and the terminal apparatus serves as a transmitting apparatus. The communication system is also applicable to Device-to-Device (D2D) communication. In this case, both the transmitting apparatus and the receiving apparatus are also the terminal apparatus. Note that the base station apparatus includes a Remote Radio Head (RRH, an apparatus including a smaller outdoor type radio unit than the base station apparatus, also referred to as Remote Radio Unit (RRU)). The RRH is also referred to as a remote antenna or a distributed antenna. The RRH can also be considered as a special form of a base station apparatus. For example, the RRH may be a base station apparatus that has only a signal processing unit, and is configured to configure parameters used in RRHs by other base station apparatus, determine scheduling, and the like.

The communication system is not limited to data communication between a terminal apparatus and a base station apparatus involving a human, and may also be applied to the form of data communication that does not require human intervention, such as Machine Type Communication, (MTC), Machine-to-Machine Communication (M2M Communication), communication for Internet of Things (IoT), and Narrow Band-IoT (NB-IoT) (hereinafter referred to as MTC). In this case, the terminal apparatus is also referred to as an MTC terminal.

In radio multiple access of the communication system, Orthogonal Frequency Multiple Access (OFDMA) based on a communication scheme, an Orthogonal Frequency Division Multiplexing (OFDM), may be used in uplink and downlink. The radio multiple access of the communication system may use SC-FDMA based on a transmission scheme, a Discrete Fourier Transform-Spread-OFDM (DFT-S-OFDM) or Clustered DFT-S-OFDM. The communication system may also use Filter Bank Multi Carrier (FBMC) applied with a filter, Filtered-OFDM (f-OFDM), Universal Filtered-OFDM (UF-OFDM), Windowing-OFDM (W-OFDM), a transmission scheme using sparse codes (Sparse Code Multiple Access (SCMA)), or the like. The communication system may apply DFT precoding and use signal waveforms using the filters described above. The communication system may apply code spreading, interleaving, sparse codes, and the like in the transmission scheme. Note that in the following embodiments, the uplink is described using DFTS-OFDM transmission and the downlink is described using OFDM transmission, but the present invention is not limited this, and other transmission schemes can be applied.

The base station apparatus and the terminal apparatus according to the following embodiments can communicate in frequency bands of so-called licensed bands in which permission for use (license) have been obtained from a country or a region in which a radio operator provides service, and/or in frequency bands of so-called unlicensed bands which do not require permission for use (license) from a country or a region.

According to the present embodiments, "X/Y" includes the meaning of "X or Y". According to the present embodiments, "X/Y" includes the meaning of "X and Y". According to the present embodiments, "X/Y" includes the meaning of "X and/or Y".

First Embodiment

FIG. 1 is a diagram illustrating an example of the configuration of a communication system according to the present embodiment. The communication system according to the present embodiment includes a base station apparatus 10, and terminal apparatuses 20-1 to 20-n1 (n1 is the number of terminal apparatuses connected to the base station apparatus 10). The terminal apparatuses 20-1 to 20-n1 are also collectively referred to as a terminal apparatus 20. A coverage 10a is a range (communication area) in which the base station apparatus 10 can connect with the terminal apparatus 20 (also referred to as a cell).

In the communication system of FIG. 1, the following uplink physical channels are included. The uplink physical channels are used for transmitting information output from a higher layer.

Physical uplink control channel
Physical uplink shared channel
Physical random access channel The physical uplink control channel is a physical channel used to transmit Uplink Control Information (UCI).

The uplink control information includes positive acknowledgement (ACK)/negative acknowledge (NACK) for downlink data (downlink transport block, Downlink-Shared Channel (DL-SCH)). The ACK/NACK are also referred to as a signal indicating the confirmation of delivery, a HARQ-ACK, or a HARQ feedback. The uplink control information can also include Scheduling Request (SR).

The uplink control information can also include Channel State Information (CSI) for the downlink. The channel state information includes a Rank Indicator (RI) indicating a preferred number of spatial multiplexing (the number of layers), a Precoding Matrix Indicator (PMI) indicating preferred precoder, a Channel Quality Indicator (CQI) to specify a preferred transmission rate, and the like. The PMI indicates a codebook determined by a terminal apparatus. The codebook relates to the precoding of a physical downlink shared channel. The CQI can be a preferred modulation scheme (e.g., Binary Phase Shift Keying (BPSK), quadrature Phase Shift Keying (QPSK), quadrature amplitude modulation (16 QAM), 64 QAM, 256 QAM, and the like), and a coding rate in a prescribed band.

The physical uplink shared channel is a physical channel used to transmit uplink data (uplink transport block, UL-SCH). The physical uplink shared channel may be used to transmit an ACK/NACK for downlink data and/or channel state information. The physical uplink shared channel may be used to transmit uplink control information. The physical uplink shared channel may be generated by adding a Cyclic Redundancy Check (CRC) to uplink data. The CRC may be scrambled (also referred to as exclusive-or operation, masking, encryption) using a sequence to represent an identifier (also referred to as User Equipment Identifier (UE ID)) of a terminal apparatus. As the UE ID, a Cell-Radio Network Temporary Identifier (C-RNTI), a Temporary C-RNTI (T C-RNTI), a Semi Persistent Scheduling C-RNTI (SPS C-RNTI), and the like can be used. For example, the UE ID is allocated to the terminal apparatus by the base station apparatus in response to an access to a new cell by the terminal apparatus using a cell update procedure. The base station apparatus notifies each terminal apparatus of a UE ID. The UE ID may also be included in message 2 (Random Access Response (RAR))/message 4 (Contention Resolution) in the random access procedure. The UE ID can also be included in a Radio Resource Control (RRC) message.

The physical uplink shared channel is used to transmit an RRC message. The RRC message is information/signal processed in a radio resource control layer. The RRC message can include UE Capability of the terminal apparatus. The UE Capability is information indicating a function supported by the terminal apparatus. The physical uplink shared channel is used to transmit a MAC Control Element (CE). The MAC CE is information/signal that is processed (transmitted) in a Medium Access Control (MAC) layer. For example, a power headroom may be included in the MAC CE and reported via the physical uplink shared channel. In other words, a MAC CE field is used to indicate a level of the power headroom. The uplink data may include an RRC message and a MAC CE.

The physical random access channel is used to transmit a preamble used for random access.

In the uplink, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and/or a Sounding Reference Signal (SRS).

The demodulation reference signal is associated with transmission of the physical uplink shared channel or the physical uplink control channel. For example, the base station apparatus 10 uses the demodulation reference signal to perform channel compensation in a case of demodulating the physical uplink shared channel or the physical uplink control channel. The demodulation reference signal sequence may be generated in association with the cell ID of the base station apparatus 10. The demodulation reference signal sequence may be generated by applying cyclic shift and Orthogonal Cover Code (OCC).

The sounding reference signal is not associated with transmission of the physical uplink shared channel or the physical uplink control channel. For example, the base station apparatus 10 uses a sounding reference signal to perform measurement of channel state (CSI Measurement) of the uplink.

In the communication system of FIG. 1, the following downlink physical channels are used. The downlink physical channels are used for transmitting information output from the higher layer.

Physical broadcast channel
Physical control format indicator channel
Physical hybrid automatic repeat request indicator channel
Physical downlink control channel
Physical downlink shared channel The physical broadcast channel is used for broadcasting a Master Information Block (MIB, a Broadcast Channel (BCH)) that is shared by the terminal apparatuses. The MIB is system information. The physical broadcast channel includes control information to broadcast. For example, the physical broadcast channel includes information such as a downlink system band, a System Frame Number (SFN), the number of transmit antennas used by the base station apparatus, and the like.

The physical control format indicator channel is used to notify a region capable of transmitting downlink control information. For example, the physical control format indicator channel indicates how many OFDM symbols are reserved from the beginning of each subframe in order to transmit downlink control information.

The physical hybrid automatic repeat request indicator channel is used to transmit an ACK/NACK to the physical uplink shared channel.

The physical downlink control channel is used to transmit Downlink Control Information (DCI). For the downlink control information, multiple formats (also referred to as DCI formats) based on applications are defined. Each format is used depending on the applications. The downlink control information includes control information for downlink data transmission (control information related to downlink data transmission) and control information for uplink data transmission (control information related to uplink data transmission).

The DCI format for downlink data transmission is used for scheduling of the physical downlink shared channel. The DCI format for downlink data transmission is also referred to as downlink grant (DL Grant, downlink assignment). The DCI format for downlink data transmission includes downlink control information such as information related to the resource allocation of the physical downlink shared channel, information related to Modulation and Coding Scheme (MCS) for the physical downlink shared channel, information related to a HARQ process number, re-transmission of downlink data, and the like. The DCI format for downlink data transmission may include Transmit Power Control (TPC) for the physical uplink channel (e.g., a physical uplink control channel, a physical uplink shared channel), and a reference signal (for example, a sounding reference signal).

The DCI format for uplink data transmission is used to notify the terminal apparatus of control information related to the transmission of the physical uplink shared channel. The DCI format for uplink data transmission is also referred to as uplink grant (UL Grant, uplink assignment). The DCI format for uplink data transmission can include uplink control information such as information related to the resource allocation of the physical uplink shared channel, information related to the MCS of the physical uplink shared channel, information related to the re-transmission of the uplink data (physical uplink shared channel), transmit power control for the physical uplink channel, information related to cyclic shift for demodulation reference signal, Channel State Information (CSI, also referred to as reception quality information) request (CSI request) of the downlink, the HARQ process number, and the like. Note that one or more pieces of information included in the DCI format for uplink data transmission can be included in the DCI format for downlink data transmission.

The physical downlink control channel is generated by adding a Cyclic Redundancy Check (CRC) to downlink control information. In the physical downlink control channel, the CRC is scrambled using the identifier of the terminal apparatus (UE ID). For example, the CRC is scrambled using a Cell-Radio Network Temporary Identifier (C-RNTI).

The physical downlink shared channel is used to transmit downlink data (downlink transport block, DL-SCH). The physical downlink shared channel is used to transmit a system information message (System Information Block (SIB)). The SIB can be transmitted being shared (cell-specific) by multiple terminal apparatuses in a cell. Information specific to a terminal apparatus (user specific) can be transmitted using the SIB dedicated to a certain terminal apparatus. Note that some or all of the system information messages can be included in the RRC message.

The physical downlink shared channel is used to transmit an RRC message. The RRC message transmitted from the base station apparatus may be shared (cell-specific) by multiple terminal apparatuses in a cell. Information shared by the terminal apparatuses in the cell may be transmitted using cell-specific RRC messages. The RRC message transmitted from the base station apparatus may be a dedicated message to a certain terminal apparatus (also referred to as dedicated signaling). Information specific to a terminal apparatus (user specific) can be transmitted using the RRC message dedicated to the certain terminal apparatus.

The physical downlink shared channel is used to transmit a MAC CE. The RRC message and/or MAC CE is also referred to as higher layer signaling. The physical downlink shared channel is used for a base station apparatus to transmit information data to each terminal apparatus.

The physical downlink shared channel is generated by adding a Cyclic Redundancy Check (CRC). The CRC is scrambled using the identifier of the terminal apparatus (UE ID).

In the downlink of FIG. 1, a Synchronization signal (SS) and a Downlink Reference Signal (DL RS) are used as downlink physical signals. The downlink physical signals are not used for transmission of information output from the higher layers, but are used by the physical layer.

A synchronization signal is used for the terminal apparatus to take/track synchronization in the frequency domain and the time domain in the downlink. The downlink reference signal is used for the terminal apparatus to perform channel compensation on the downlink physical channel. For example, the downlink reference signal is used to demodulate the physical broadcast channel, the physical downlink shared channel, and the physical downlink control channel. The downlink reference signal can be used for the terminal apparatus to perform calculation (measurement) of the channel state information of the downlink. Reference signals used to demodulate various channels and reference signals used for the measurement may be different (e.g., for a reference signal used to demodulate various channels, a Demodulation Reference Signal (DMRS) in LTE is used, and for measurement, a CSI-RS is used. Reference signals used to demodulate various channels and reference signals used for the measurement may be the same. (e.g., Cell-specific Reference Signal (CRS)).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the MAC layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

In FIG. 1, the base station apparatus 10 and the terminal apparatus 20 support grant based multiple access in the uplink and downlink (also referred to as grant based access or scheduled access). In the downlink, the base station apparatus 10 transmits the downlink physical channel by using the physical resources notified in the downlink grant to the terminal apparatus 20 (notified in information related to resource allocation). In the uplink, the terminal apparatus 20 transmits the uplink physical channel by using the physical resources indicated in the uplink grant by the base station apparatus 10 (notified in information related to resource allocation). Physical resources are resources defined by a time domain (OFDM symbol) and a frequency domain (subcarrier).

The base station apparatus 10 and the terminal apparatus 20 may support multiple access (also referred to as grant free access) using grant free (also referred to as grant-less, contention based) in the uplink and the downlink. For example, in grant free access of the uplink, the terminal apparatus 20 transmits the uplink data (such as the uplink physical link channel), irrespective of the reception of the uplink grant from the base station apparatus 10 (without reception of the uplink grant). The base station apparatus 10 can notify the terminal apparatus 20 of information indicating that the grant free access is supported, by using a broadcast channel/RRC message/system information (e.g. SIB). The terminal apparatus 20 can notify the base station apparatus 10 of UE Capability indicating that grant free access is supported.

In uplink grant free access, the terminal apparatus 20 may randomly select physical resources for transmitting uplink data. For example, the base station apparatus 10 notifies the terminal apparatus 20 of multiple candidates of available physical resources as a resource pool. The resource pool is notified in a broadcast channel/RRC message/system information. The terminal apparatus 20 selects physical resources randomly from the resource pool.

In uplink grant free access, the uplink multi access resource is defined by a Signature resource (Multi Access Signature Resource) and the physical resource (Multi Access Physical Resource). The physical resource and the signature resource may be used to identify the uplink physical channel transmitted by each terminal apparatus. The signature resource candidates are included in the resource pool. The terminal apparatus 20 selects a signature resource from the resource pool. The signature resource is configured with at least one multi access signature among a multiple multi access signature group (also referred to as a multi access signature pool). The multi access signature is information indicating a characteristic (mark, indication) that distinguishes (identifies) the uplink physical channel transmitted by each terminal apparatus. The multi access signature includes spatial multiplexing patterns, spreading code patterns (Walsh code, Orthogonal Cover Code (OCC), cyclic shift for data spreading, sparse code, etc.), interleaved patterns, demodulation reference signal patterns (reference signal sequence, cyclic shift), transmit power, and the like. In grant free access, the terminal apparatus transmits the uplink data using the selected one or more multi access signatures.

The base station apparatus 10 transmits the downlink signal to the terminal apparatus 20, by using OFDM with the subcarrier spacing f_scs. The terminal apparatus 20 transmits the uplink signal to the base station apparatus 10 by using DFT-s-OFDM with the subcarrier spacing f_scs. In the communication system illustrated in FIG. 1, multiple subcarrier spacings f_scs are defined in the uplink and the downlink. For example, the subcarrier spacing f_scs is defined by n_scs*f_scs_o. f_scs_o is the reference subcarrier spacing [Hz]. n_scs is $2^a$ or $2^{(-a)}$ (a is a natural number). n_scs may be defined as $a^b$ (a is a natural number, b is 1 or −1). The base station apparatus 10 transmits the downlink signal to the terminal apparatus 20 by using any of the multiple subcarrier spacings. The terminal apparatus 20 transmits the downlink signal to the base station apparatus 10 by using any of the multiple subcarrier spacings.

The terminal apparatus 20 can notify the base station apparatus 10 of information indicating the subcarrier spacing supported in UE Capability. The base station apparatus 10 notifies the terminal apparatus 20 of the subcarrier spacing used by the physical channels in the uplink and the downlink. The subcarrier spacing is notified using a broadcast channel/RRC message/system information/DCI. The base station apparatus 10 may also include control information related to the uplink subcarrier spacing in the DCI format for downlink data transmission. The subcarrier spacing may be associated with the multi access (grant free access, scheduled access). For example, the subcarrier spacing in grant free access is configured larger than the subcarrier spacing used in scheduled access. The subcarrier spacing may be associated with a UE ID. For example, for each subcarrier spacing, a range of an allocated UE ID may be configured. In this case, the terminal apparatus 20 may identify the subcarrier spacing used for transmission of the physical channel, by the UE ID allocated by the base station apparatus 10 to the own terminal apparatus. The base station apparatus 10 can notify, by the DCI, for each subcarrier spacing, information related to the resource allocation used for the physical channel transmission in the uplink and the downlink.

Figure 2:
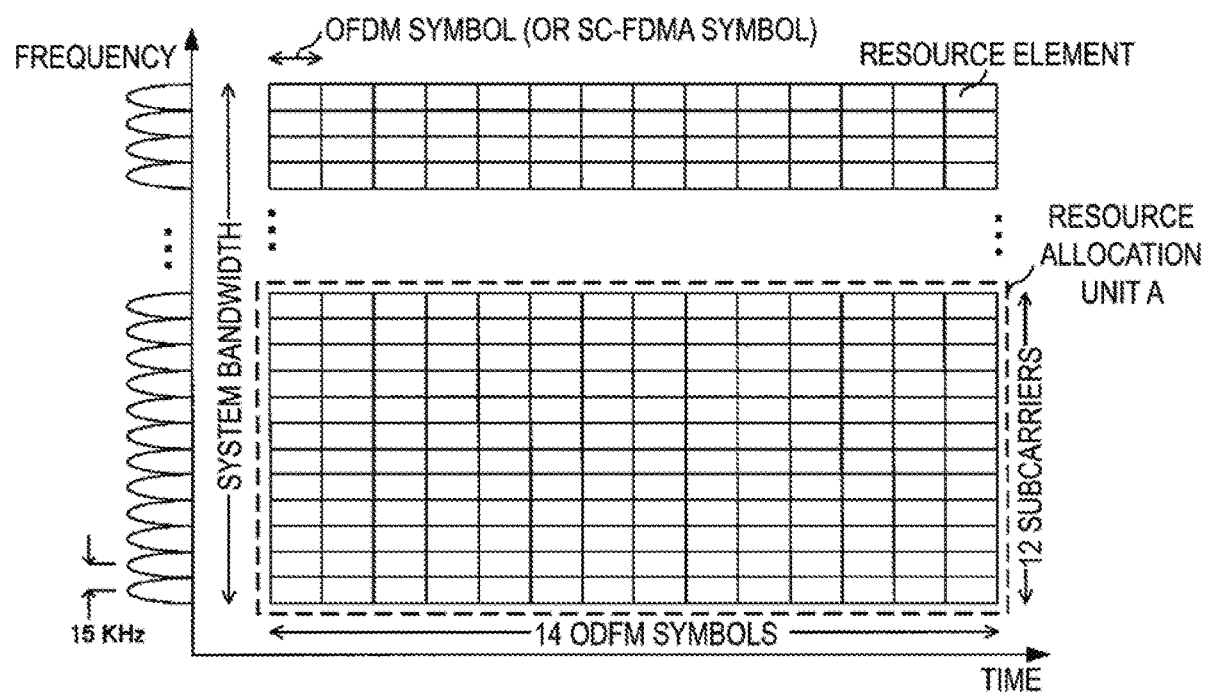
FIG. 2 is a diagram illustrating an example of physical resources of the communication system according to the first embodiment.
Figure 3:
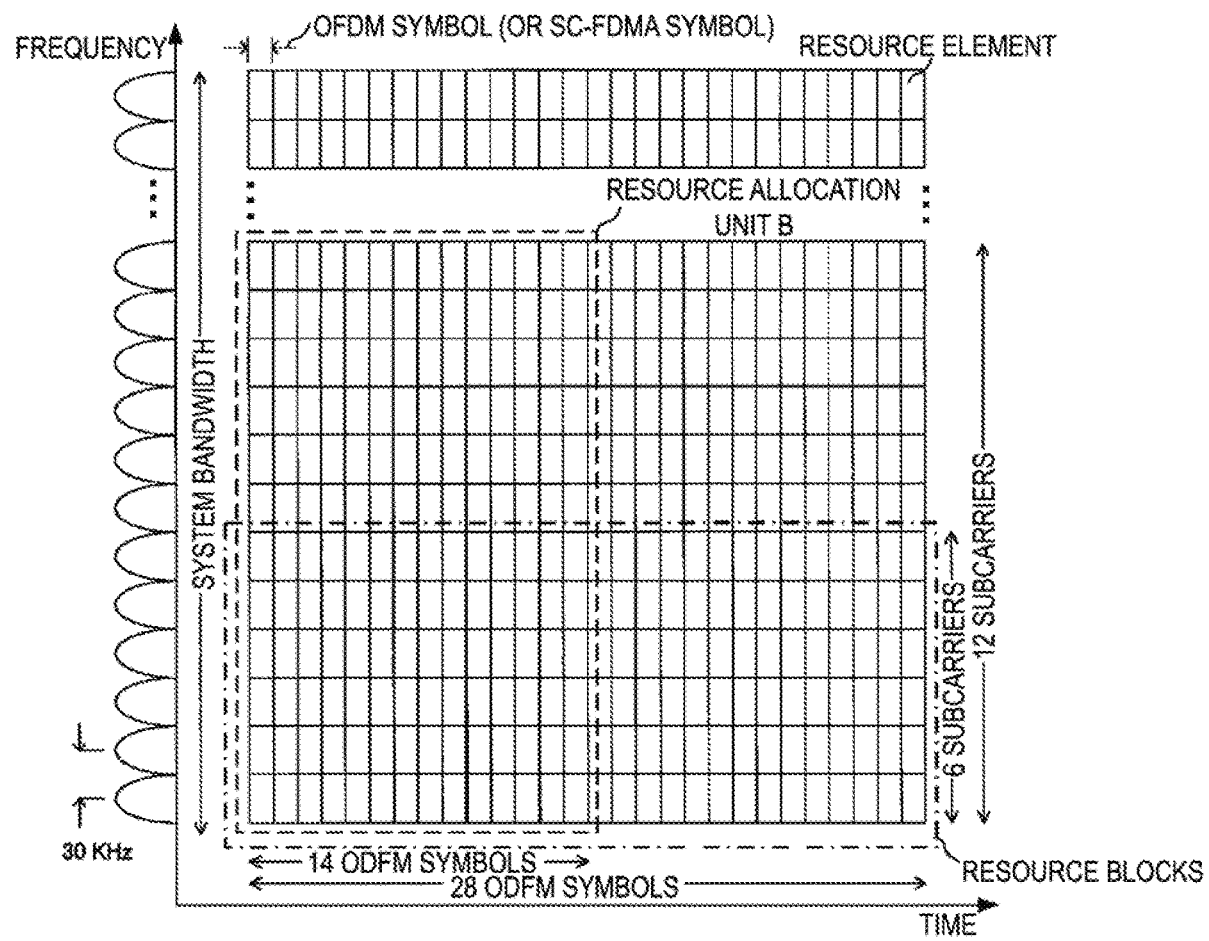
FIG. 3 is a diagram illustrating another example of physical resources of the communication system according to the first embodiment.

FIG. 2 is a diagram illustrating an example of physical resources of the communication system according to one embodiment of the present embodiment. FIG. 2 is an example of the subcarrier spacing f_scs=15 kHz (n_scs=1). FIG. 3 is a diagram illustrating another example of physical resources of the communication system according to one embodiment of the present embodiment. FIG. 2 is an example of the subcarrier spacing f_scs=30 kHz (n_scs=2). The base station apparatus 10 can configure subcarrier spacings for each system band. The base station apparatus 10 may configure subcarrier spacings used for each system band, depending on Quality of Service (QoS), a Transmission Time Interval (TTI) of the uplink and downlink physical channel to the terminal apparatus 20, and an application (eMBB, mMTC, uRLLC). The TTI is the minimum time unit of scheduling. Enhanced Mobile Broadband (eMBB) is used for large capacity communication with high frequency utilization efficiency. Massive Machine Type Communication (mMTC) is used for accommodating multiple terminals and transmitting small data to each terminal. Ultra-Reliable and Low Latency Communication (uRLLC) is used for communication with high reliability and low latency.

The communication system according to one embodiment of the present embodiment can also configure subcarrier spacings for each frequency band used for transmission of the physical channel. In the communication system, a default subcarrier spacing may be configured for each frequency band. For example, in a case that two frequency bands are used, the default subcarrier spacing in the high frequency band is configured to be larger than the default subcarrier spacing in the low frequency band. The base station apparatus 10 and the terminal apparatus 20 transmit the physical channel by using a reference subcarrier spacing in accordance with the frequency band.

In the communication system according to the present embodiment, a prescribed resource allocation unit is defined for mapping a physical channel. The resource allocation unit is defined as the number of subcarriers and the number of OFDM symbols (the number of SC-FDMA symbols in a case of using DFT-S-OFDM). The base station apparatus 10 can notify information related to the resource allocation in the uplink grant and the downlink grant, by the number of resource allocation units. FIG. 2 and FIG. 3 are examples in which the resource allocation unit includes 12 subcarriers and 14 OFDM symbols (resource allocation unit A in FIG. 2 and resource allocation unit B in FIG. 3). FIG. 2 and FIG. 3 is an example in which the resource allocation unit is defined with the same number of subcarriers irrespective of the subcarrier spacing. Note that the number of subcarriers of the resource allocation unit may be defined depending on the subcarrier spacing. For example, in a case of the subcarrier spacing f_scs=15 kHz (n_scs=1), the resource allocation unit includes 12 subcarriers, and in a case of the subcarrier spacing f_scs=30 kHz (n_scs=2), the resource allocation unit includes six subcarriers.

Figure 4:
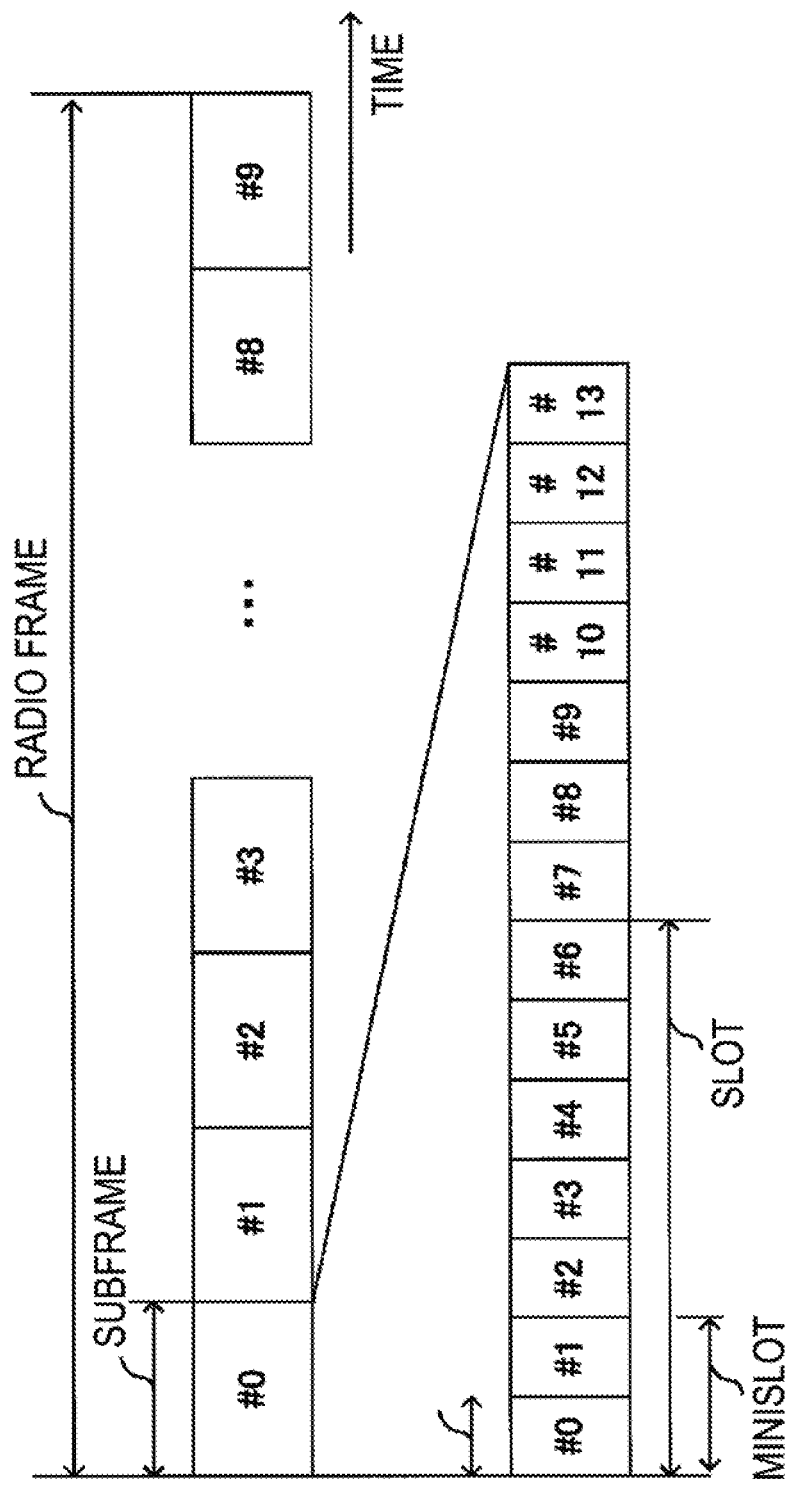
FIG. 4 is a diagram illustrating an example of the radio frame configuration of the communication system according to the first embodiment.

The number of OFDM symbols constituting the resource allocation unit can use different configurations, depending on quality of service (QoS), a Transmission Time Interval (TTI), and applications (eMBB, mMTC, uRLLC). The TTI is the minimum time unit of scheduling. For example, the number of OFDM symbols constituting the resource allocation unit is configured in subframe units, slot units, and mini slot units. FIG. 4 is a diagram illustrating an example of the radio frame configuration of the communication system according to the present embodiment. The radio frame configuration indicates the configuration in the physical resources of the time domain. FIG. 4 is an example of the subcarrier spacing SCS=15 kHz. In the downlink and uplink, one radio frame includes multiple subframes. FIG. 4 is an example in which one radio frame includes 10 subframes. FIG. 4 is an example in which one subframe includes 14 OFDM symbols. For example, in a case that the radio frame length with the subcarrier spacing 15 kHz is 10 ms, the subframe length is 1 ms. In a case that the resource allocation unit is configured in subframe units, the number of OFDM symbols constituting the resource allocation unit is 14.

One slot includes multiple OFDM symbols generated in the subcarrier spacing which the base station apparatus 10 and the terminal apparatus 20 use to transmit physical channels and physical signals. FIG. 4 is an example in which one slot includes seven OFDM symbols. FIG. 4 is an example in which one subframe includes two slots. For example, in a case that the subframe length in the subcarrier spacing 15 kHz is 1 ms, the slot length is 0.5 ms. The communication system according to the present embodiment may use slots as the minimum unit in which the base station apparatus 10 and the terminal apparatus 20 map to physical channels (e.g., physical data shared channels, physical control channels). In this case, the number of OFDM symbols constituting the resource allocation unit matches the number of OFDM symbols constitution the slot.

One mini slot includes multiple OFDM symbols (e.g., two, four) generated in the subcarrier spacing which the base station apparatus 10 and the terminal apparatus 20 use to transmit physical channels. The mini slot length is shorter than the slot length. FIG. 4 is an example in which one mini slot includes two OFDM symbols. The base station apparatus 10 may configure the number of OFDM symbols constituting the slot/mini slot. The base station apparatus 10 may signal the number of OFDM symbols constituting the slot/mini slot to notify the terminal apparatus 20 of the number of OFDM symbols. The communication system according to the present embodiment may use slots as the minimum unit in which the terminal apparatus 20 map to physical channels (e.g., physical data shared channels, physical control channels). In this case, the number of OFDM symbols constituting the resource allocation unit matches the number of OFDM symbols configuration the mini slot. Note that although FIG. 4 is described in the example of the subcarrier spacing SCS=15 kHz, a section of multiple time domains (subframe, slot, mini slot) may be defined in other subcarrier spacings.

In the communication system according to the present embodiment, a reference physical resource region can be defined. A reference physical resource region may be defined as a resource allocation unit with a reference subcarrier spacing. For example, in a case that the subcarrier spacing f_scs=15 kHz (n_scs=1) is used as reference, the resource allocation unit of FIG. 2 is a reference physical resource region (hereinafter, a reference physical resource region is referred to as a resource block). The base station apparatus 10 can notify information related to the resource allocation in the uplink grant and the downlink grant, by the number of resource blocks.

Resource blocks may be defined based on frequency bandwidth [Hz] and time [msec]. In a case that the resource allocation unit (the number of subcarriers of 12 and the number of OFDM symbols of 14) with the subcarrier spacing f_scs=15 kHz in FIG. 2 is used as the reference, the resource block is a region of frequency bandwidth 180 kHz and time period 1 msec. The resource block is associated with physical resources with other subcarrier spacing, based on the bandwidth [Hz] and time [sec] of this reference. In FIG. 3, the subcarrier spacing f_scs=30 kHz is twice as large as the reference subcarrier spacing f_scs=15 kHz (the OFDM symbol length is ½). Thus, in the physical resources of the subcarrier spacing f_scs=30 kHz, the resource block is defined by six subcarriers and 28 OFDM symbols. This allows resource blocks to be uniquely defined regardless of subcarrier spacings.

The resource allocation unit to which the base station apparatus 10 and the terminal apparatus 20 map physical channels may be represented using resource blocks. For example, in FIG. 2, in a case that the terminal apparatus 20 transmits the uplink physical channel by using two resource allocation units A, the region for mapping the uplink physical channel can be represented as two resource blocks. In FIG. 3, in a case that two resource allocation units B are used to transmit the uplink physical channel, the frequency domain for mapping the uplink physical channel can be represented as four resource blocks.

The resource block may be defined based on the number of subcarriers and the number of OFDM symbols. In this case, the base station apparatus 10 can notify information related to the resource allocation in the uplink grant and the downlink grant, in resource block units. For example, in a case that a range of physical resources including the number of subcarriers of 12 and the number of OFDM symbols of 14 is a resource block (i.e., in a case that the range of a resource block is uniquely configured by the number of subcarriers and the number of OFDM symbols irrespective of the carrier interval), the resource allocation unit matches the resource block in the subcarrier spacing f_scs=15 kHz or 30 kHz. In this case, in a case that the terminal apparatus 20 transmits the uplink physical channel using two resource allocation units A, the region for mapping the uplink physical channel can be represented as two resource blocks. In FIG. 3, in a case that two resource allocation units B are used to transmit the uplink physical channel, the domain for mapping the uplink physical channel can be represented as two resource blocks. As a result, the resource blocks can be defined by the same number of subcarriers and OFDM symbols, regardless of the subcarrier spacing.

Figure 5:
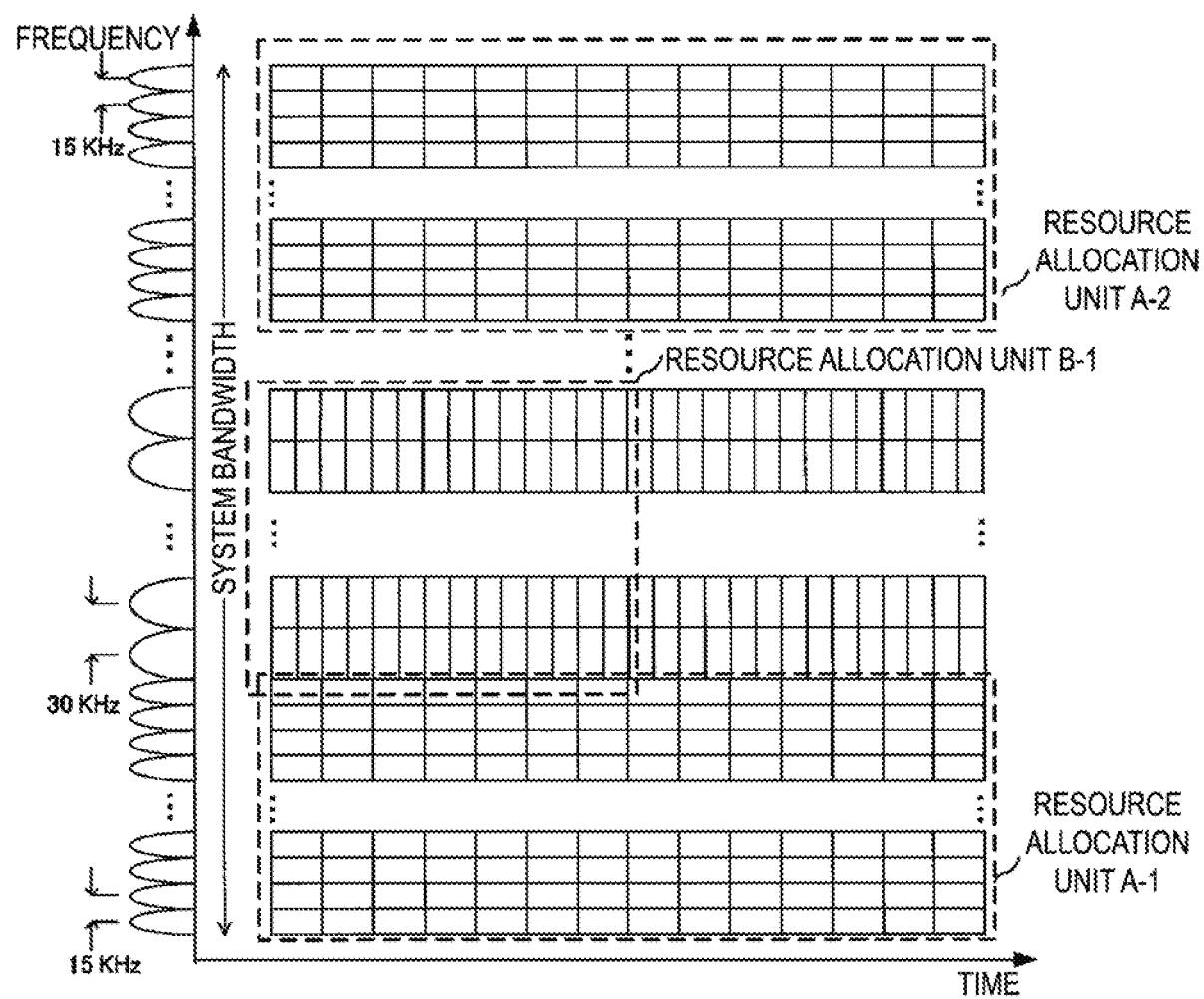
FIG. 5 is a diagram illustrating another example of physical resources of the communication system according to the first embodiment.

The base station apparatus 10 may configure multiple subcarrier spacings in one system band. FIG. 5 is a diagram illustrating another example of physical resources of the communication system according to one embodiment of the present embodiment. FIG. 5 is an example in which the subcarrier spacings f_scs=15 kHz and 30 kHz are performed Frequency Division Multiplexing (FDM) within one system band. In FIG. 5, the subcarrier spacing allocated to both ends in the system band is smaller than the subcarrier spacing allocated to the inner side. The base station apparatus 10 schedules the region for mapping the uplink and downlink physical channels to the terminal apparatus 20 in accordance with Qos and applications. For example, in a case that the terminal apparatus 20-1 transmits the uplink physical channel in the eMBB application, the base station apparatus 10 allocates the resource allocation unit A (resource allocation unit A-1/resource allocation unit A-2) with the subcarrier spacing f_scs=15 kHz to the terminal apparatus 20-1. In a case that the terminal apparatus 20-2 transmits the uplink physical channel in the URLLC application, the base station apparatus 10 allocates the resource allocation unit B with the subcarrier spacing f_scs=30 kHz to the terminal apparatus 20-2. Note that, within one system band, the frequency domain in which subcarriers of each subcarrier spacing is allocated may be configured in advance.

The base station apparatus 10 can simultaneously allocate physical resources of multiple subcarrier spacings to one terminal apparatus 20-1 in the uplink and the downlink. For example, in FIG. 5, the base station apparatus 10 can allocate physical channels to the resource allocation unit A-1 and the resource allocation unit B-1 with overlapping OFDM symbols for the terminal apparatus 20-1. In FIG. 5, the base station apparatus 10 may allocate the physical channel for the terminal apparatus 20-1, across all resource allocation units within the system band simultaneously (overlapping OFDM symbols). The base station apparatus 10 can notify information related to the resource allocation used for transmission of the physical channel for each subcarrier spacing in DCI.

The base station apparatus 10 may also notify the terminal apparatus 20 of allocation bandwidth information of each subcarrier spacing used for physical channel transmission in the uplink and the downlink. The allocation bandwidth information of the subcarrier spacing may be notified by a broadcast channel/RRC message/system information/DCI. The base station apparatus 10 may also include the allocation bandwidth information of the subcarrier spacing of the uplink, in the DCI format for downlink data transmission. The allocation bandwidth information of the subcarrier spacing may be the proportion of the bandwidth transmitted at each subcarrier spacing, among the total bandwidth of the physical resources allocated to the terminal apparatus 20-1 to transmit the uplink data.

Figure 6:
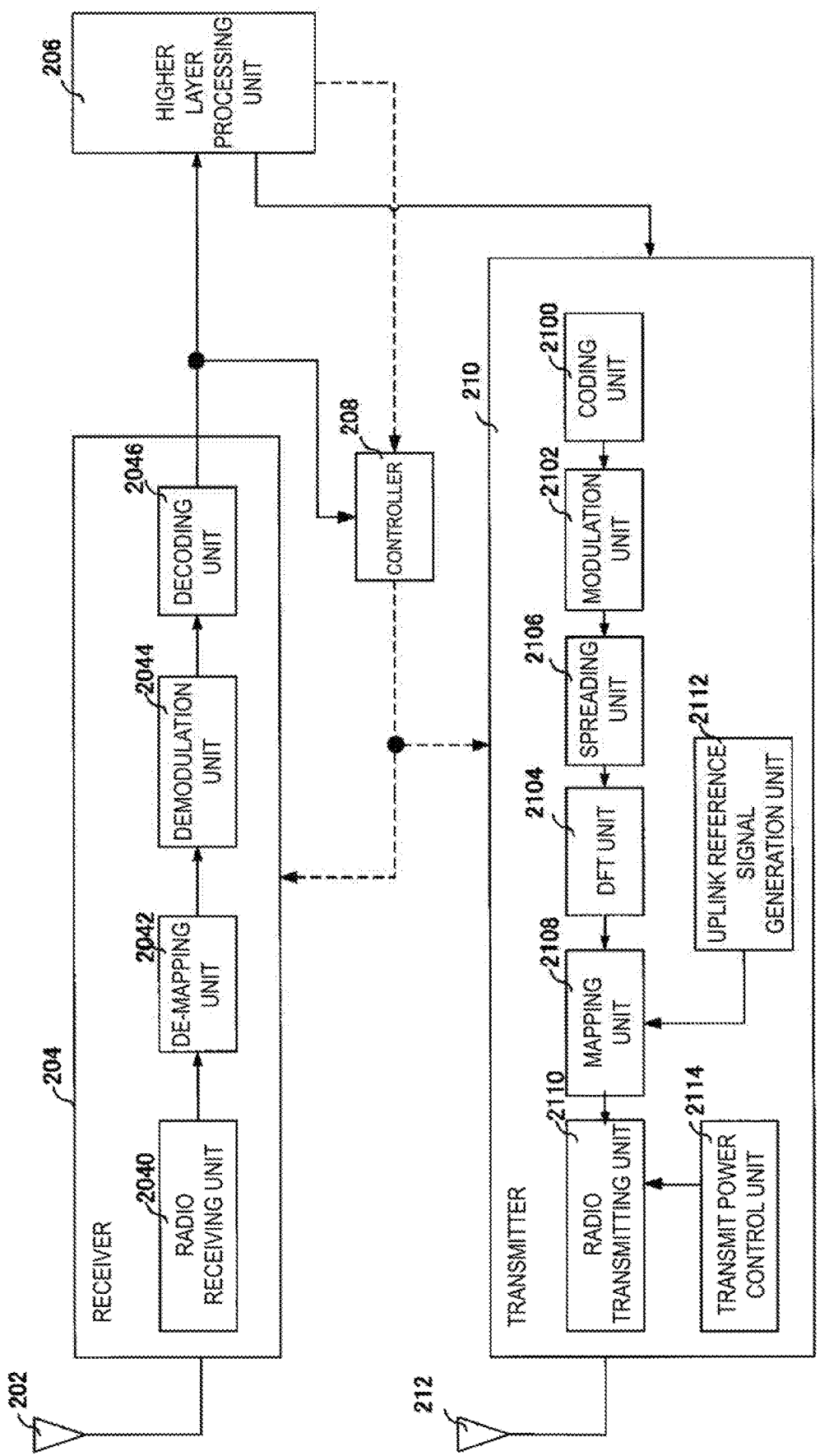
FIG. 6 is a diagram illustrating an example of the configuration of a base station apparatus of the communication system according to the first embodiment.

FIG. 6 is a schematic block diagram illustrating the configuration of the terminal apparatus 20 according to the present embodiment. The terminal apparatus 20 includes a receive antenna 202, a receiver (reception step) 204, a higher layer processing unit (higher layer processing step) 206, a controller (control step) 208, a transmitter (transmission step) 210, and a transmit antenna 212. The receiver 204 includes a radio receiving unit (radio reception step) 2040, a de-mapping unit (demultiplexing step) 2042, a demodulation unit (demodulation step) 2044, and a decoding unit (decoding step) 2046. The transmitter 210 includes a coding unit (coding step) 2100, a modulation unit (modulation step) 2102, a DFT unit (DFT step) 2104, a spreading unit (spreading step) 2106, a mapping unit (mapping step) 2108, a radio transmitting unit (radio transmission step) 2110, an uplink reference signal generation unit (uplink reference signal generation step) 2112, and a transmit power control unit 2114.

The receiver 204 receives the downlink signal (downlink physical channel and downlink physical signal) transmitted by the base station apparatus 10 via the receive antenna 202, and separates, demodulates, and decodes each downlink signal. The receiver 204 outputs the physical downlink control channel separated from the downlink signal to the controller 208 after demodulation and decoding. The receiver 204 outputs the decoding result of the downlink physical channel to the higher layer processing unit 206.

The radio receiving unit 2040 converts, by down converting, the downlink signal received through the receive antenna 202 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally demodulated analog signal into a digital signal. The radio receiving unit 2040 removes part corresponding to the Cyclic Prefix (CP) from the converted digital signal, performs fast Fourier transform (demodulation processing for the OFDM modulation) for the downlink signal from which the CP is removed, and extracts a signal in the frequency domain.

The de-mapping unit 2042 separates and extracts the downlink physical channel (physical downlink control channel, physical downlink shared channel, physical broadcast channel, or the like), the downlink reference signal and the like included in the downlink signal in the extracted frequency domain. The de-mapping unit 2042 includes a channel measurement function (channel measurement unit) that uses the downlink reference signal. The de-mapping unit 2042 includes a channel compensation function (channel compensation unit) of the downlink signal using the channel measurement result. The de-mapping unit outputs the downlink physical channel to the demodulation unit 2044.

The demodulation unit 2044 performs demodulation processing using a modulation scheme determined in advance or notified in the downlink grant in advance, such as BPSK, QPSK, 16 QAM, 64 QAM, or 256 QAM, on each of the modulation symbols of each downlink physical channel.

The decoding unit 2046 performs decoding processing on coded bits of each of the demodulated downlink physical channels at a coding rate of a prescribed coding scheme determined in advance, the coding rate being determined in advance or notified in advance in the downlink grant. The decoding result of the downlink physical channel is output to the higher layer processing unit 206 and the controller 208.

The controller 208 acquires the DCI included in the physical downlink control channel from the receiver 204. The controller 208 acquires, from the receiver 204/higher layer processing unit 206, broadcast information/system information/RRC messages or the like included in the physical broadcast channel/physical downlink shared channel, or the like. The broadcast information/system information/RRC message or the like includes configuration information related to downlink reception/configuration information related to uplink transmission. The controller 208 controls each block included in the receiver 204, by using the control information related to downlink data reception/configuration information related to downlink reception included in the DCI. The controller 208 controls each block included in the transmitter 210, by using the control information related to the uplink data transmission /configuration information related to uplink data transmission included in the DCI. The control information related to downlink reception/the configuration information related to downlink reception may include configuration information related to uplink and downlink grant free access/information related to subcarrier spacings of the uplink and downlink/allocation bandwidth information for each subcarrier spacing. The control information related to the downlink reception/the configuration information related to downlink reception may include information related to uplink transmit power control. The control information related to the uplink transmission/the configuration information related to the uplink transmission may include configuration information related to uplink grant free access/information related to uplink subcarrier spacing/allocation bandwidth information for each subcarrier spacing/information related to uplink transmit power control. The information related to the uplink transmit power control includes various parameters used to calculate the terminal apparatus transmit power (details are described below). Note that in a case that the transmitter 210 transmits the physical uplink control channel, the controller 208 generates the Uplink Control information (UCI) and outputs the generated information to the transmitter 210. Note that some of the functions of the controller 208 can be included in the higher layer processing unit 102.

The higher layer processing unit 206 performs processing of the medium access control (MAC) layer, the packet data convergence protocol (PDCP) layer, the radio link control (RLC) layer, and the radio resource control (RRC) layer. The higher layer processing unit 206 outputs information (UE capability) related to functions of the terminal apparatus supported by the own terminal apparatus to the transmitter 210. For example, the higher layer processing unit 206 signals information related to the functions of the terminal apparatus in the RRC layer.

The information related to the functions of the terminal apparatus includes information for indicating whether the terminal apparatus supports a prescribed function, or information for indicating that the terminal apparatus has completed the introduction and test of the prescribed function. Information of whether the prescribed function is supported includes information of whether the introduction and test of the prescribed function have been completed. In a case that the terminal apparatus supports the prescribed function, the terminal apparatus transmits information (parameters) for indicating whether the prescribed function is supported. In a case that the terminal apparatus does not support the prescribed function, the terminal apparatus may not transmit information (parameters) for indicating whether the prescribed function is supported. In other words, information of whether the prescribed function is supported is notified by information of whether the information (parameters) for indicating whether the prescribed function is supported is transmitted. Note that the information (parameters) for indicating whether the prescribed function is supported may be notified by using one bit of 1 or 0.

The information related to the functions of the terminal apparatus includes information indicating the subcarrier spacing supported, information indicating that grant free access is supported, and information related to the supported frequency band. The information indicating the subcarrier spacing supported may be associated with the information indicating that grant free access is supported and the information related to the supported frequency band. For example, the base station apparatus 10 may identify the subcarrier spacing by information related to the frequency band transmitted by the terminal apparatus 20.

The higher layer processing unit 206 manages various configuration information of the own terminal apparatus. The higher layer processing unit 206 is input with the various configuration information to the controller 208/the transmitter 210. The higher layer processing unit 206 inputs configuration information related to uplink transmission acquired from the downlink physical channel/configuration information related to downlink reception to the controller 208. The higher layer processing unit 206 calculates configuration parameters for controlling each block of the receiver 204/transmitter 210, by using configuration information related to the uplink transmission/configuration information related to the downlink reception, and inputs the calculated configuration parameters to the controller 208. The higher layer processing unit 206 generates configuration information (UE Capability, Buffer Status Report (BSR), power headroom report, or the like) notified to the base station apparatus 10, and inputs the generated information to the transmitter 210.

The higher layer processing unit 206 outputs the uplink data (e.g., DL-SCH) generated by operations of the user, or the like to the transmitter 210. The higher layer processing unit 206 can output, to the transmitter 210, uplink data generated without operations of the user (for example, data acquired by the sensor). The uplink data may include a field for storing a UE ID. The higher layer processing unit 206 adds a CRC to the uplink data. The CRC parity bits are generated using the uplink data. The CRC parity bits are scrambled with the UE ID allocated to the terminal apparatus itself (also referred to as exclusive-or operation, masking, or encryption).

In a case that the uplink data is generated in the scheduled access, the transmitter 210 generates information for requesting the allocation of uplink resources such as Scheduling Request (SR) and BSR to the base station apparatus 10. The transmitter 210 transmits the physical uplink shared channel and the physical link control channel, based on control information related to the uplink transmission/ configuration information related to the uplink transmission included in the DCI. In the grant free access, in a case that the uplink data is generated, the transmitter 210 transmits the physical uplink shared channel, without reception of the uplink grant, based on the configuration information related to the grant free access transmitted from the base station apparatus 10. The transmitter 210 transmits the physical uplink shared channel in accordance with information related to the subcarrier spacing input from the controller 208/information related to the uplink transmit power control.

The coding unit 2100 codes the uplink data, UCI, and the like input from the higher layer processing unit 206, by using a coding scheme determined in advance/configured by the controller 208. The coding scheme may apply convolutional coding, turbo coding, Low Density Parity Check (LDPC) coding, Polar coding, and the like. In addition to the coding rate ⅓, the coding may use a mother code such as a lower coding rate ⅙ or 1/12. The modulation unit 2102 modulates the coded bits input from the coding unit 2100 with a modulation scheme notified in the DCI or a modulation scheme prescribed for each channel such as BPSK, QPSK, 16 QAM, 64 QAM, and 256 QAM (which may also include π/2 shift BPSK, π/2 shift QPSK).

In a case that configuration of a spreading code sequence is input from the controller 208, the spreading unit 2106 multiplies the spreading code sequence by the sequence output from the modulation unit 2102 in accordance with the configuration. For example, in a case that a spreading code is configured for a signature resource in grant free access, the spreading unit 2106 performs spreading processing based on the configuration. In a case that interleaving is configured as a signature resource, the spreading unit 2106 may be replaced with an interleaved unit. The interleaved unit performs interleaving processing on the sequence output from the DFT unit according to the configuration of a interleave pattern input from the controller 208. Even in a case that other signature resources are applied, it may be replaced similarly. Note that spreading processing may be performed on a sequence after DFT processing.

The DFT unit 2104 performs Discrete Fourier Transform (DFT) processing after sorting modulation symbols in parallel after spreading which are output from the spreading processing unit 2106. Here, a zero symbol row may be added to the modulation symbols, and DFT may be performed to make a signal waveform that uses a zero section instead of a CP as a time signal after IFFT. A specific sequence such as Gold sequence and Zadoff-Chu sequence may be added to the modulation symbols, and DFT may be performed to generate a signal waveform that uses a specific pattern instead of a CP as a time signal after IFFT. However, in a case that the signal waveform is OFDM, DFT is not applied.

The uplink reference signal generation unit 2112 generates a demodulation reference signal in accordance with the configuration information of the demodulation reference signal input from the controller 208. The configuration information of the demodulation reference signal includes a physical cell identity (PCI) (also referred to as Cell ID, or the like) for identifying the base station apparatus 10, the number of subcarriers for mapping the uplink reference signal (bandwidth), the number of OFDM symbols, the cyclic shift, the OCC sequence, and the like. The configuration information of the demodulation reference signal is acquired from the control information related to the uplink transmission/the configuration information related to the uplink transmission.

In accordance with the information related to the resource allocation included in the control information related to the uplink data transmission, the mapping unit 2108 maps the uplink physical channel (the output signal of the DFT unit 2104) and/or the uplink reference signal to the resource element (time/frequency/spatial multiplexing).

The radio transmitting unit 2110 performs DFT-s-OFDM scheme modulation to generate SC-FDMA symbols by performing Inverse Fast Fourier Transform (IFFT) on the multiplexed signals. The radio transmitting unit 2110 performs inverse fast Fourier transform in accordance with the configuration of the subcarrier spacing. For example, in a case that the number of IFFT points of 2048 is used for the subcarrier spacing f_scs=15 kHz, the radio transmitting unit 2110 uses the number of IFFT points of 1024 for the subcarrier spacing f_scs=30 kHz. Note that the SC-FDMA symbols of multiple subcarrier spacings may be generated by the inverse fast Fourier transform and are not bound to the generation method.

The radio transmitting unit 2110 adds a CP to the SC-FDMA symbols, and generates a baseband digital signal. Furthermore, the radio transmitting unit 2110 converts the baseband digital signal into an analog signal, removes excess frequency components, converts the signal after the removal to a carrier frequency by up converting, power-amplifies the converted signal, and transmits the DFT-S-OFDM signal to the base station apparatus 10 via the transmit antenna 212. The radio transmitting unit 2110 performs power amplification in accordance with the configuration of the terminal apparatus transmit power input from the transmit power control unit 2112.

Based on the information related the uplink transmit power input from the controller 208, the transmit power control unit 2112 performs transmit power control corresponding to each uplink physical channel. Based on the information related to the uplink transmit power input from the controller 208, the transmit power control unit 2112 calculates the terminal apparatus transmit power corresponding to each uplink physical channel. Note that the information related to uplink transmit power control notified by the base station apparatus 10 in the RRC/DCI includes information notified by the base station apparatus 10 to calculate the terminal apparatus transmit power.

For example, the terminal apparatus transmit power P_PUSCH (i) [dBm] for transmitting the physical downlink shared channel is determined by Equation (1).

$$P_{PUSCH}(i) = \min \left\{ \begin{array}{c} P_{CMAX}(i), \\ 10\log_{10}(M_{PUSCH}(i)) + P_{O\_PUSCH}(j) + \\ \alpha(j) \cdot PL + \Delta_{TF}(i) + f(i) \end{array} \right\} \quad \text{Equation 1}$$

(Equation 1)

i is a reference of the time domain for defining a value for each term constituting the terminal apparatus transmit power. In the following, i is described as a reference subframe number for calculating the value of each term. P_CMAX [dBm] is the acceptable maximum output power of the terminal apparatus. P_CMAX is set within a range between the upper limit P_CMAX_H and the lower limit P_CMAX_L. The lower limit P_CMAX_L is defined as MIN {P_EMAX−ΔT_C P_PowerClass−MAX (MPR, c+A-MPR+ΔT_C, P−MPR)}. The upper limit P_CMAX_H is defined as MIN {P_EMAX P_PowerClass}. Here, MIN {A B} indicates that the smaller one of the values A and B is selected. MAX {A B} indicates that the larger one of the values A and B is selected.

The P_EMAX is a parameter used for the base station apparatus 10 to limit uplink transmit power of a carrier frequency used to transmit uplink data to the terminal apparatus 20. The base station apparatus 10 uses an RRC to notify the terminal apparatus 20 of P_EMAX. P_EMAX may be configured in accordance with the subcarrier spacing used at the carrier frequency. The P_PowerClass [dBm] is the maximum transmit power configured for each frequency band used by the terminal apparatus 20 for uplink data transmission.

MPR is a value of the Maximum Power Reduction allowed by P_PowerClass. MPR is defined based on the transmission bandwidth allocated to the uplink data and the modulation scheme for the uplink data. The terminal apparatus configures MPR according to the transmission bandwidth allocated to the uplink data and the modulation scheme. A-MPR is a value of an additional maximum power reduction allowed for the spectrum of the uplink data to satisfy requirements of Adjacent Channel Leakage Ratio (ACLR) and spectrum radiation. The base station apparatus 10 uses an RRC to notify the terminal apparatus 20 of A-MPR.

P-MPR is a value of the maximum power reduction allowed to ensure compliance with requirements such as unnecessary radiation, in a case of transmitting uplink data simultaneously with multiple Radio Access Technologies (RATs). The terminal apparatus 20 may configure P-MPR. MPR/A-MPR/P-MPR may be configured for each subcarrier spacing of the subcarriers for transmitting uplink data. For example, MPR/A-MPR/P-MPR is configured larger in a case that the subcarrier spacing is large, than a case that the subcarrier spacing is small. In this way, in a case that the subcarrier spacing of the physical resources for mapping the physical downlink shared channel is large (e.g., f_scs=30 kHz), the lower limit value P_CMAX can be configured lower than a case that the subcarrier spacing is small (for example, f_scs=15 kHz). Thus, unnecessary radiation, out-of-band radiation, and adjacent channel power leakage generated by increasing the subcarrier spacing can be reduced.

$\Delta T\_C$ is a correction value configured to bring a margin to an allowable error in P_PowerClass. $\Delta T\_C$ is used to satisfy the configuration of a spectral mask at both ends of the transmission bandwidth of the uplink data. In the communication system according to the present embodiment, $\Delta T\_C$ may be configured based on the subcarrier spacing of the subcarriers for transmitting uplink data. For example, $\Delta T\_C$ is configured larger in a case that the subcarrier spacing is large, than a case that the subcarrier spacing is small.

M_PUSCH (i) indicates the bandwidth of the resources allocated for transmission of the physical uplink shared channel in the subframe i. 10Log10 (M_PUSCH (i)) is a correction value determined by the physical resources to which the uplink data channel is mapped. P_O_PUSCH (j) [dBm] is a target reception power level of the physical uplink shared channel in the base station apparatus 10. M_PUSCH (i) and/or P_O_PUSCH (j) may be configured for each subcarrier spacing for transmitting uplink data. P_O_PUSCH (j) is configured by P_O_NOMINAL_PUSCH (j)+P_O_UE_PUSCH (j)+P_O_SCS_PUSCH (i). P_O_NOMINAL_PUSCH (j) is an element of a target reception power level (target reception power value) configured being cell-specific. P_O_UE_PUSCH (j) is an element of a target reception power level that is configured specific to the terminal apparatus. The base station apparatus 10 notifies the terminal apparatus 20 of P_O_NOMINAL_PUSCH (j) and P_O_UE_PUSCH (j) in an RRC. P_O_SCS_PUSCH (j) is an element of a target reception power level configured depending on the subcarrier spacing to which the uplink data is allocated.

j is a parameter determined by the type of the uplink data. j=0 indicates a case that the physical link uplink shared channel is scheduled in Semi-Persistent (in a case of being scrambled with a SPS C-RNTI). j=1 indicates that the physical link uplink shared channel is in dynamic scheduling (e.g., in a case of being scrambled with a C-RNTI). j=2 indicates a case that data related to random access (e.g., message 3) is transmitted. In a case that the physical uplink shared channel is transmitted in grant free access, the configuration of j=1 or j=2 can be used. P_O_NOMINAL_PUSCH (j), P_O_UE_PUSCH (j), and P_O_SCS_PUSCH (j) can be configured for each value of j. For example, in a case of j=2, P_O_UE_PUSCH (2) is 0. In a case of j=0 or 1, P_O_SCS_PUSCH is a value varying depending on the subcarrier spacing, and in a case of j=2, P_O_SCS_PUSCH is fixed and configured to 0.

A configuration example of M_PUSCH (i) and P_O_PUSCH (j) in a case that multiple subcarrier spacings are used will be described. The example is a case that M_PUSCH (i) is the number of resource allocation units allocated for transmission of the physical uplink shared channel in the subframe i. Here, the resource allocation unit is defined by the number of subcarriers (i.e., the resource allocation unit is the same number of subcarriers irrespective of the subcarrier spacing). In this case, the P_O_PUSCH (j) is configured to be smaller as the resource allocation unit has a larger subcarrier spacing.

For example, P_O_NOMINAL_PUSCH (j) and P_O_UE_PUSCH (j) constituting P_O_PUSCH (j) are configured at the target reception power level at the reference subcarrier spacing. In a case that the subcarrier spacing of the resource allocation unit allocated with the physical uplink shared channel is N times as large as the reference subcarrier spacing, P_O_SCS_PUSCH (i) is configured to 10Log10 (1/N). In other words, in a case that the subcarrier spacing of the resource allocation unit allocated with the physical uplink shared channel is N times as large, P_O_PUSCH (j) is configured to one Nth. In FIG. 2 and FIG. 3, P_O_PUSCH (j) in f_scs=30 kHz is configured to one half of P_O_PUSCH (j) in f_scs=15 kHz (reference subcarrier spacing). Note that an element of P_O_SCS_PUSCH (i) configured based on the subcarrier spacing may be configured to be included in P_O_NOMINAL_PUSCH (j) or/and P_O_UE_PUSCH (j). Note that P_O_SCS_PUSCH (i) may adjust the value 10Log10 (1/N) dependent on the reference subcarrier spacing by a prescribed coefficient $\beta$ (P_O_SCS_PUSCH (i)=$\beta$*10Log10 (1/N)). For example, the coefficient 13 is used to adjust the upper limit value/lower limit value of P_O_SCS_PUSCH (i).

M_PUSCH (i) can be defined by the number of resource blocks allocated for transmission of the physical uplink shared channel in the subframe i. Here, the resource blocks are uniquely configured with the number of subcarriers and the number of OFDM symbols (i.e., the resource blocks are the same number of subcarriers, irrespective of the subcarrier spacing). In this case, as described above, P_O_PUSCH (j) is configured to be smaller as the resource blocks have a larger subcarrier spacing. For example, P_O_NOMINAL_PUSCH (j) and P_O_UE_PUSCH (j) constituting P_O_PUSCH (j) are configured at the target reception power level at the reference subcarrier spacing. In a case that the subcarrier spacing of the resource blocks allocated with the physical uplink shared channel is N times as large as the reference subcarrier spacing, P_O_SCS_PUSCH (i) is configured to 10Log10 (1/N).

Another configuration example of M_PUSCH (i) and P_O_PUSCH (j) in a case that multiple subcarrier spacings are used will be described. The example is a case that M_PUSCH (i) is the number of resource blocks allocated for transmission of the physical uplink shared channel in the subframe i. Here, the resource blocks are defined by a frequency bandwidth [Hz] (i.e., resource blocks are in the different number of subcarriers depending on the subcarrier spacing). In this case, the number of resource blocks of M_PUSCH (i) is configured depending on the ratio of the frequency bandwidth [Hz] of the number of resource allocation units to which the uplink physical channel is allocated and the frequency bandwidth [Hz] of the resource blocks. For example, P_O_PUSCH (j) configures the target reception power level, based on a case that the resource allocation unit A in the subcarrier spacing f_scs=15 kHz is configured as a resource block. The frequency bandwidth (Hz) of the resource block is 180 kHz. In a case that the physical uplink shared channel is mapped to one resource allocation unit A, M_PUSCH (i) is configured to one resource block. On the other hand, in a case of the subcarrier spacing f_scs=30 kHz, six subcarriers are included in the frequency bandwidth (180 [kHz]) of the resource block. In a case that the physical uplink shared channel is mapped to one resource allocation unit B, M_PUSCH (i) is configured to two resource blocks. As in the two examples above, M_PUSCH (i) and P_O_PUSCH (j) are configured depending on the subcarrier spacing of the physical resources to which the physical uplink shared channel is mapped. As a result, the terminal apparatus transmit power can be flexibly configured even in a case that the subcarrier spacing is changed. In addition, it is possible to flexibly adjust the spectrum radiation by changing the subcarrier spacing.

In a case that physical resources of multiple subcarrier spacings are allocated simultaneously, M_PUSCH (i) and P_O_PUSCH (j) may be configured for each subcarrier spacing. In Equation 1, M_PUSCH (i) and P_O_PUSCH (j) may be provided with terms for each subcarrier spacing. P_O_PUSCH (j) may be notified for each subcarrier spacing by using an RRC/DCI. M_PUSCH (i) is configured by using information related to the resource allocation notified for each subcarrier spacing. M_PUSCH (i) for each subcarrier spacing is configured by using the allocation bandwidth information for the subcarrier spacing.

$\alpha(j)*PL$ is a term for compensating for path loss. PL is an estimate of the path loss calculated in the transmit power control unit 2114. PL is calculated by using Reference Signal Received Power (RSRP). The reference signal power used in calculating PL is notified from the base station apparatus 10 by using an RRC. The reference signal power may be used to provide the downlink reference signal EPRE. The reference signal power is configured for each subcarrier spacing. $\alpha(j)$ is a coefficient multiplied by PL to control the effect of the path loss in the terminal apparatus transmit power P_PUSCH. $\alpha(j)$ is selected from candidates configured for each type of uplink data. For example, in a case of j=0 or 1, $\alpha(j)$ is selected from {0, 0.4, 0.5, 0.7, 0.8, 0.9, 1}. In a case of j=2, $\alpha(j)$ is configured to 1. $\alpha(j)$ is selected from among the candidates by the base station apparatus 10. $\alpha(j)$ selected by the base station apparatus 10 is notified by an RRC. Candidates of $\alpha(j)$ may be configured for each frequency band. In this case, the coefficient is $\alpha(j, f)$, and f is a parameter indicating the frequency band. For example, the higher the carrier frequency is, the greater the path loss is, so the terminal apparatus needs to transmit at a large power, and the power consumption increases. Therefore, the higher the carrier frequency is, the smaller the coefficient $\alpha(j, f)$ is, and the smaller the term that compensates for path loss is. As a result, even in a case of using a high carrier frequency, it is possible to suppress the increase in power consumption of the terminal apparatus. Each frequency band is associated with a subcarrier spacing. Each frequency band is configured with a reference subcarrier spacing.

$\Delta\_TF$ (i) is an offset value that compensates for the reception level in accordance with MCS of the uplink data.

f (i) [dB] is a correction value used to dynamically adjust the terminal apparatus transmit power P_PUSCH by a DCI. f (i) in the subframe i is configured by sequentially adding the update value $\delta\_tpc$ [dB] to the f (i−1) configured in the subframe i−1 ($\delta\_tpc$ is also referred to as an accumulated value). For example, f (i) is determined by f (i−1)+$\delta\_tpc$.

f (i) in the subframe i can be configured by the update value $\delta\_tpc$ [dB], regardless of the configuration in the subframe i ($\delta\_tpc$ is also referred to as an absolute value). For example, f (i) is $\delta\_tpc$.

The update value $\delta\_tpc$ is associated with the Transmission Power Control Command included in the DCI. The transmit power control unit 2114 can retain a table associating the transmission power control command and the update value. For example, the 2 bit transmission power control command [00 01 10 11] indicates an update value $\delta\_tpc$=[−1, 0, 1, 3], respectively. In this case, in the candidate update value set including four update values, one update value selected by the base station apparatus 10 is notified by using the transmission power control command. The 1 bit transmission power control command [0 1] indicates an update value $\delta\_tpc$=[−1, 1], respectively. In this case, in the candidate update value set including two update values, one update value selected by the base station apparatus 10 is notified by using the transmission power control command. In this way, in the communication system according to the present embodiment, multiple candidate update value sets having a different number of candidate update values are configured. f (i) may be configured for each subcarrier spacing of subcarriers for transmitting uplink data, by using a candidate update value set having a different number of candidate update values.

In the communication system according to the present embodiment, multiple candidate update value sets having the same number of candidate update values are configured. For example, in a case that the transmission power control command is two bits, the first candidate update value set [−1, 0, 1, 3] and the second candidate update value set [−4, −1, 1, 4] are configured. The first candidate update value set and the second candidate update value set differ in the increase or decrease width (update width, variable width). The transmit power control unit 2114 of the update value selects the first candidate update value set or the second candidate update value set in accordance with update candidate set indication information transmitted by the base station apparatus 10. The update candidate set indication information is transmitted by the base station apparatus by using the RRC. Furthermore, the transmit power control unit 2114 selects, in the selected candidate update value set, an update value indicated by the transmission power control command. For example, in a case that the second update value candidate set is indicated and the transmission power control command is "00", the update value $\delta\_tpc$=−4 is selected. Here, the candidate update value set may be configured by a frequency band. For example, a candidate update value set having a larger increase or decrease width (update width, variable width) may be used as the carrier frequency increases. The terminal apparatus may have a frequency band accumulated value $\delta\_tpc$ (f). In this case, the base station apparatus notifies the terminal apparatus of the transmission power control command for each frequency band.

The transmission power control command may be associated with an update value for each subcarrier spacing. The transmit power control unit 2114 can retain a table of transmission power control commands and update values associated with each other for each subcarrier spacing. f (i) can be independently configured for each subcarrier spacing of subcarriers for transmitting uplink data. The correction value f (i) and the update value $\delta\_tpc$ are configured based on the subcarrier spacing of M_PUSCH (i) and/or P_O_P-

USCH (j). In the correction value f (i) using the accumulated value, f (i−1) can be interpreted as a subframe which is one subframe before the subject subframe and in which the uplink data has been transmitted by using the same subcarrier spacing. In one DCI format, a field of transmission power control command may be provided for each subcarrier spacing. f (i) can change the increase or decrease width for each subcarrier spacing of the subcarriers for transmitting uplink data (different increase or decrease widths can be configured). f (i) is configured for each subcarrier spacing of the subcarriers for transmitting uplink data by using a different candidate update value set. For example, as the subcarrier spacing of the subcarriers allocated with the uplink data is larger, f (i) is configured by using higher increase or decrease width of the update value candidate set. The increase or decrease width of δ_tpc in a case that the uplink data is transmitted at the subcarrier spacing f_scs=30 kHz is set to be larger than a case of transmission at the subcarrier spacing f_scs=15 kHz. In a case of the subcarrier spacing f_scs=15 kHz, f (i) is configured by using the update value selected from the first candidate update value set. On the other hand, in a case of the subcarrier spacing f_scs=30 kHz, f (i) is configured by using the update value selected from the second candidate update value set.

A reference subcarrier spacing is configured for each frequency band for transmission of uplink data. The reference subcarrier spacing for a high frequency band (e.g., millimeter wave band) is configured larger than the reference subcarrier spacing for a low frequency band (e.g., microwave band). f (i) can change the increase or decrease width for each reference subcarrier spacing of the frequency bands for transmitting uplink data (different increase or decrease widths can be configured). f (i) is configured for each reference subcarrier spacing of the frequency bands for transmitting uplink data by using a different candidate update value set. For example, as each reference subcarrier spacing of the frequency bands allocated with the uplink data becomes larger, f (i) is configured by using higher increase or decrease width of the update value candidate set.

In the correction value f (i) using the accumulated value, in a case that the subcarrier spacing used in the subframe i−1 differs from the subcarrier spacing used in the subframe i, the correction value f (i) is configured to the initial value f (0)=0 (the correction value f (i) is reset). Note that the initial value f (0) need not be limited to 0, and may be a value predetermined as an initial value. The initial values may be configured to different values for each subcarrier spacing. In a case that the subcarrier spacing used in the subframe i−1 differs from the subcarrier spacing used in the subframe i, the subcarrier spacing may be changed from the correction value f (i) using the accumulated value to the correction value f (i) using the absolute value.

As described above, the transmit power control unit 2114 can flexibly adjust errors of the terminal apparatus transmit power P_PUSCH caused by differences in the subcarrier spacing and frequency (e.g., errors of the amplifier, estimation errors of path loss, errors caused by interference from adjacent cells, and the like). Note that a dedicated DCI format may be defined for transmission of a transmission power control command. The DCI format dedicated to transmission power control command transmission may include a subcarrier spacing and a transmission power control command for the subcarrier spacing. The subcarrier spacing and the transmission power control command for the subcarrier spacing may be associated one-for-one (in a pair) and transmitted.

Figure 7:
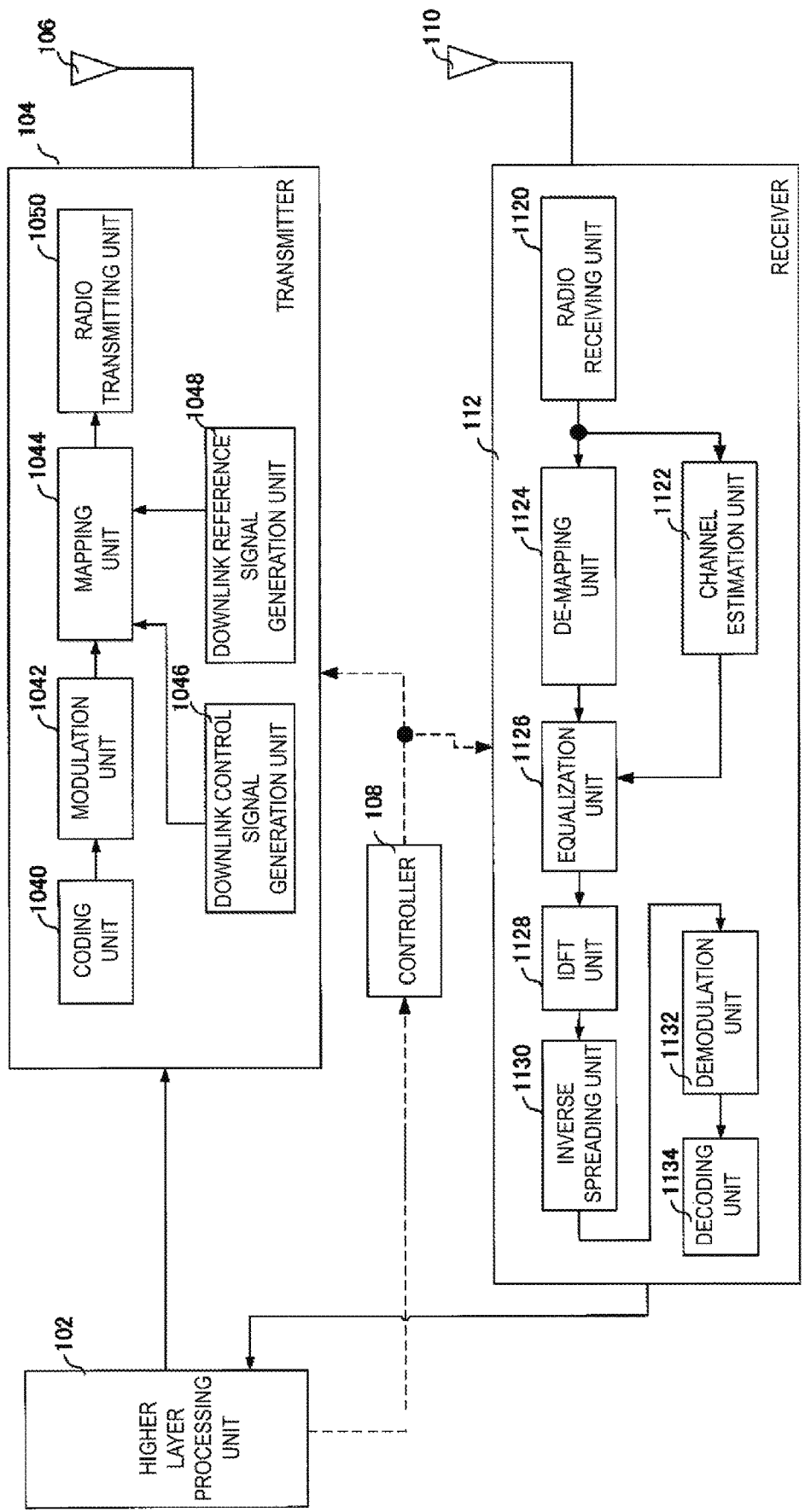
FIG. 7 is a diagram illustrating an example of the configuration of a terminal apparatus of the communication system according to the first embodiment.

FIG. 7 is a schematic block diagram illustrating a configuration of the base station apparatus 10 according to the present embodiment. The base station apparatus 10 includes a higher layer processing unit (higher layer processing step) 102, a transmitter (transmission step) 104, a transmit antenna 106, a controller (control step) 108, a receive antenna 110, and a receiver (reception step) 112. The transmitter 104 includes a coding unit (coding step) 1040, a modulation unit (modulation step) 1042, a mapping unit (mapping step) 1044, a downlink control signal generation unit (downlink control signal generation step) 1046, a downlink reference signal generation unit (downlink reference signal generation step) 1048, and a radio transmitting unit (radio transmission step) 1050. The receiver 112 includes a radio receiving unit (radio reception step) 1120, a channel estimation unit (channel estimation step) 1122, a de-mapping unit (de-mapping step) 1124, an equalization unit 1126 (equalization step), an IDFT unit 1128 (IDFT step), an inverse spreading unit 1130 (inverse spreading step), a demodulation unit 1132 (demodulation step), and a decoding unit 1134 (decoding step).

The higher layer processing unit 102 performs processing of the higher layer than the physical layer, such as a Medium Access Control (MAC) layer, a Packet Data Convergence Protocol (PDCP) layer, a Radio Link Control (RLC) layer, a Radio Resource Control (RRC) layer. The higher layer processing unit 102 generates information necessary to control the transmitter 104 and the receiver 112, and outputs the generated information to the controller 108. The higher layer processing unit 102 outputs downlink data (e.g., DL-SCH), broadcast information (e.g., BCH), Hybrid Automatic Request indicator (HARQ indicator), and the like to the transmitter 104.

The higher layer processing unit 102 receives information related to a terminal apparatus, such as functions of the terminal apparatus 20 (UE capability), from the terminal apparatus (via the receiver 112). The functions of the terminal apparatus include information indicating the subcarrier spacing supported, and the like. The higher layer processing unit 102 receives, from the terminal apparatus 20, higher layer signaling such as a BSR and power headroom report.

The higher layer processing unit 102 generates or acquires from the higher node, broadcast system information (MIB, SIB). The higher layer processing unit 102 outputs the broadcast system information to the transmitter 104. Note that part of the SIB can be transmitted uniquely to the terminal apparatus.

The higher layer processing unit 102 generates or acquires from the higher node, downlink data (transport block) mapped to the physical downlink shared channel, system information (SIB), RRC message, MAC CE, and the like, and outputs it to the transmitter 104. The higher layer processing unit 102 can include some or all of configuration information related to uplink transmission/configuration information related to downlink transmission, and configuration information for grant free access, in the higher layer signaling. The higher layer processing unit 102 outputs these pieces of configuration information to the controller 108/the transmitter 104. The configuration information related to the uplink transmission/the configuration information related to the downlink transmission may include information related to the subcarrier spacings in the uplink and the downlink/allocation bandwidth information for each subcarrier spacing. The configuration information related to the uplink transmission may include information related to uplink transmit power control. The higher layer processing unit 102 may generate a dedicated SIB for notifying information related to the subcarrier spacing of the uplink and downlink/allocation bandwidth information for each subcarrier spacing/information related to uplink transmit power control.

The higher layer processing unit 102 determines a coding rate, a modulation scheme (or MCS), and a transmit power of a physical channel (physical downlink shared channel, physical uplink shared channel, and the like). The higher layer processing unit 102 outputs the coding rate/modulation scheme/transmit power to the transmitter 104/controller 108/receiver 112. The higher layer processing unit 102 can include the coding rate/modulation scheme/transmit power in higher layer signaling.

The controller 108 controls the transmitter 104 and the receiver 112, based on various configuration information input from the higher layer processing unit 102. The controller 108 schedules the uplink data, based on the BSR, power headroom report or the like. The controller 108 controls the receiver 112, based on the contents of the uplink grant transmitted to the terminal apparatus 20 (resource allocation of uplink data for each terminal apparatus, subcarrier spacing, MCS, etc.). The controller 108 generates downlink control information (DCI), based on configuration information related to the downlink transmission input from the higher layer processing unit 102 and configuration information related to the uplink transmission, and outputs the DCI to the transmitter 104. The downlink control information may include control information related to the uplink and downlink subcarrier spacings/information related to uplink transmit power control. Note that the functions of the controller 108 can be included in the higher layer processing unit 102.

The transmitter 104 codes and modulates broadcast information, downlink control information, downlink shared channels, and the like input from the higher layer processing unit 102 for the terminal apparatus 20, and generates a physical broadcast channel, a physical downlink control channel, and a physical downlink shared channel. The coding unit 1040 codes the broadcast information and the downlink shared channel by using the coding scheme predetermined/determined by the higher layer processing unit 102 (including repetition). The coding scheme may apply convolutional coding, turbo coding, Low Density Parity Check (LDPC) coding, Polar coding, and the like. The modulation unit 1042 modulates coded bits input from the coding unit 1040 with a modulation scheme predetermined/determined by the higher layer processing unit 102 such as BPSK, QPSK, 16 QAM, 64 QAM, and 256 QAM.

The downlink control signal generation unit 1046 adds a CRC to the downlink control information (DCI) input from the controller 108. Furthermore, the downlink control signal generation unit 1046 codes and modulates the downlink control information, and generates a physical downlink control channel. The downlink reference signal generation unit 1048 generates a downlink reference signal.

The mapping unit 1044 maps the modulated modulation symbol of each downlink physical channel, the physical downlink control channel, and the downlink reference signal to the resource elements. The mapping unit 1044 maps the physical downlink shared channel and the physical downlink control channel to the physical resources allocated to each terminal apparatus.

The radio transmitting unit 1050 generates OFDM symbols by performing Inverse Fast Fourier Transform (IFFT) on the modulation symbols of each of the multiplexed downlink physical channels. The radio transmitting unit 1050 performs inverse fast Fourier transform, based on subcarrier spacings used for transmission of each downlink physical channel. The radio transmitting unit 1050 adds a cyclic prefix (CP) to the OFDM symbols to generate a baseband digital signal. Furthermore, the radio transmitting unit 1050 converts the digital signal into an analog signal, removes excess frequency component by filtering, converts the signal after the removal to a carrier frequency by up converting, performs power amplification, outputs the signal to the transmit antenna 106 to transmits OFDM signals.

The radio receiving unit 1120 converts, by down converting, the uplink signal received through the receive antenna 110 into a baseband signal, removes unnecessary frequency components, controls the amplification level in such a manner as to suitably maintain a signal level, performs orthogonal detection based on an in-phase component and an orthogonal component of the received signal, and converts the analog signal detected in the orthogonal detection into a digital signal. The radio receiving unit 1120 removes a portion corresponding to CP from the digital signal resulting from the conversion. The radio receiving unit 1120 performs Fast Fourier Transform (FFT) on the signal from which the CP has been removed, and extracts a signal in the frequency domain. The radio receiving unit 1120 performs a fast Fourier transform, based on the subcarrier spacing to which each uplink signal is mapped. The subcarrier spacing to which each uplink signal is mapped is notified from the controller 108.

The channel estimation unit 1122 uses the demodulation reference signal to perform channel estimation for signal detection of the uplink physical channel. The channel estimation unit 1122 measures a channel state between the base station apparatus 10 and the terminal apparatus 20, by using the demodulation reference signal sequence.

The de-mapping unit 1124 extracts an uplink physical channel (such as a physical uplink shared channel and a physical uplink control channel) and an uplink physical signal (such as a synchronization signal) for each terminal apparatus from the signal in the frequency domain input from the radio receiving unit 1120. The de-mapping unit 1124 extracts the uplink physical channels for each terminal apparatus, based on the uplink scheduling information input from the controller 108. Hereinafter, the equalization unit 1126, the IDFT unit 1128, the inverse spreading unit 1130, the demodulation unit 1132, and the decoding unit 1134 perform processing for each uplink data for each terminal apparatus.

The equalization unit 1126 performs channel compensation on signals for each terminal apparatus input from the de-mapping unit 1124, by using channel estimation results input from the channel estimation unit 1122. For example, the equalization unit 1126 multiplies the signal in the frequency domain by an equalization weights based on the MMSE norm.

The IDFT unit 1128 converts the signal in the frequency domain of each terminal apparatus after equalization into a signal in the time domain. Note that the IDFT unit 1128 corresponds to processing performed by the DFT unit 2104 of the terminal apparatus 20.

The inverse spreading unit 1130 multiplies the signal in the time domain of each terminal apparatus after IDFT by the spreading code sequence (inverse spreading processing). In the terminal apparatus 20, in a case that the spreading processing is performed on the signal after DFT, inverse spreading processing is performed on the signal before the IDFT. Note that, in a case that the terminal apparatus 20 is interleaved, de-interleave processing is performed in the terminal apparatus 20.

Into the demodulation unit 1132, information of the modulation scheme of each terminal apparatus notified in advance or predetermined is input from the controller 108. The demodulation unit 1132 performs demodulation processing on the signal after inverse spreading, based on the information of the modulation scheme, and outputs Log Likelihood Ratio (LLR) of a bit sequence.

Into the decoding unit 1134, information of the coding rate notified in advance or predetermined is input from the controller 108. The decoding unit 1134 performs decoding processing on the LLR sequence output from the demodulation unit 1132.

The higher layer processing unit 102 acquires the uplink data (the bit sequence after hard determination) after the decoding of each terminal apparatus from the decoding unit 1134. The higher layer processing unit 102 performs descrambling (exclusive-or operation) on the CRC included in the uplink data after decoding of each terminal apparatus, by using a UE ID allocated to each terminal. In a case that there is no error in the uplink data as a result of the descrambling error detection, the higher layer processing unit 102 correctly completes the identification of the terminal apparatus and determines that the uplink data transmitted from the terminal apparatus has been correctly received.

As described above, the base station apparatus 10 transmits the uplink data of the terminal apparatus 20, by using physical resources having multiple subcarrier spacings. Furthermore, the base station apparatus 10 performs uplink transmit power control for each subcarrier spacing of the physical resources. As a result, the out-of-band radiation, unnecessary radiation, and adjacent channel power leakage generated by different subcarrier spacings can be flexibly adjusted.

Second Embodiment

The present embodiment is an example of a configuration of a power headroom in a communication system that transmits uplink data and downlink data by using physical resources with multiple subcarrier spacings.

The communication system according to the present embodiment includes the base station apparatus 10 and the terminal apparatus 20 illustrated in FIG. 1 to FIG. 7. Differences/additional points from the first embodiment will be mainly described below.

The higher layer processing unit 206 of the terminal apparatus 20 calculates the Power Headroom (PH) by using information related to uplink transmit power control received from the base station apparatus 10. For example, the power headroom PH (i) [dB] is determined by Equation (2).

Equation 2

$$PH(i)=P_{CMAX}(i)-\{10 \log_{10}(M_{PUSCH}(i))+P_{O\_PUSCH}(j)+\alpha(j)\cdot PL+\Delta_{TF}(i)+f(i)\}$$  Equation 2

The parameter i, P_CMAX (i), M_PUSCH (i), P_O_P-USCH (j), a (j), PL, Δ_TF (i), and f (i) constituting the PH (i) are configured in the same manner as in Equation (1), based on the subcarrier spacing of the physical resources to which the physical uplink shared channel is mapped.

The higher layer processing unit 206 of the terminal apparatus 20 generates a power headroom report, based on a calculation result of the power headroom. The transmitter 210 of the terminal apparatus 20 transmits MAC CE including the power headroom report to the base station apparatus 10, by using the physical uplink shared channel. The transmitter 210 of the terminal apparatus 20 transmits the power headroom report to the base station apparatus 10 in a case that the path loss (PL) is greater than a predetermined threshold. The predetermined threshold is notified to the terminal apparatus 20 by the base station apparatus 10, by using higher layer signaling.

The transmitter 210 of the terminal apparatus 20 periodically transmits a power headroom report to the base station apparatus 10. The base station apparatus 10 uses the higher layer signaling to notify the terminal apparatus 20 of the transmission period of the power headroom report. The base station apparatus 10 can also notify the terminal apparatus 20 of transmission prohibition period of the power headroom report, by using higher layer signaling.

The transmitter 210 of the terminal apparatus 20 transmits the power headroom report to the base station apparatus 10 in a case that the subcarrier spacing of the physical resource allocated to transmit the physical uplink shared channel changes. The subcarrier spacing is transmitted to the terminal apparatus 20 in an RRC/DCI. The terminal apparatus 20 is configured to preferentially apply any trigger in a case that the triggers for transmission of the power headroom report overlaps. For example, the terminal apparatus 20 can prioritize over other triggers in a case that a transmission trigger of a power headroom report is generated due to a change in the subcarrier spacing. In this case, the contents of the power headroom report corresponding to the priority trigger are transmitted to the base station apparatus 10.

The controller 108 of the base station apparatus 10 performs scheduling of the physical uplink shared channel of the terminal apparatus 20 (resource allocation for transmission of the physical uplink shared channel, subcarrier spacing, and uplink transmit power control), based on the BSR, the power headroom report, or the like of the terminal apparatus 20 input from the higher layer processing unit 102.

As described above, the power headroom is calculated based on the subcarrier spacing of the physical resources allocated to transmit the physical uplink shared channel. In addition, the power headroom report is transmitted as a trigger to change the subcarrier spacing of the physical resources allocated to transmit the physical uplink shared channel. Accordingly, the power headroom report is transmitted in response to the change in the power headroom caused by subcarrier spacing and frequency differences. Thus, the base station apparatus can efficiently grasp physical resources to which the uplink data can be allocated, in consideration of errors caused by subcarrier spacing and frequency differences.

A program running on an apparatus according to one aspect of the present invention may serve as a program that controls a Central Processing Unit (CPU) and the like to cause a computer to operate in such a manner as to realize the functions of the above-described embodiments according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded in a computer readable recording medium. The functions may be realized by causing a computer system to read the program recorded in the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit or an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be suitably used in a base station apparatus, a terminal apparatus, and a communication method. An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

10 Base station apparatus
20-1 to 20-$n1$ Terminal apparatus
10$a$ Area in which base station apparatus 10 can connect with terminal apparatus
102 Higher layer processing unit
104 Transmitter
106 Transmit antenna
108 Controller
110 Receive antenna
112 Receiver
1040 Coding unit
1042 Modulation unit
1044 Mapping unit
1046 Downlink control signal generation unit
1048 Downlink reference signal generation unit
1050 Radio transmitting unit
1120 Radio receiving unit
1122 Channel estimation unit
1124 De-mapping unit
1126 Equalization unit
1128 IDFT unit
1130 Inverse spreading unit
1132 Demodulation unit
1134 Decoding unit
202 Receive antenna
204 Receiver
206 Higher layer processing unit
208 Controller
210 Transmitter
212 Transmit antenna
2100 Coding unit
2102 Modulation unit
2104 DFT unit
2106 Spreading unit
2108 Mapping unit
2110 Radio transmitting unit
2112 Uplink reference signal generation unit
2114 Transmit power control unit
2040 Radio receiving unit
2042 De-mapping unit
2044 Demodulation unit
2046 Decoding unit

The invention claimed is:

1. A terminal apparatus which communicates with a base station apparatus by using a plurality of subcarriers in at least one of a higher-frequency band and a lower-frequency band, the terminal apparatus comprising:
reception circuitry configured to receive radio resource control (RRC) signaling indicating that contention-based access is supported and including information related to a resource allocation in a unit of a quantity of resource blocks;
control circuitry configured to:
acquire the RRC signaling indicating a subcarrier spacing between the plurality of subcarriers included in an Orthogonal Frequency Division Multiplexing (OFDM) symbol;

set the subcarrier spacing in the higher-frequency band to be larger than the subcarrier spacing in the lower-frequency band; and perform transmission power control based on a value of an allowed maximum power reduction (MPR), the allowed MPR being defined based on at least the subcarrier spacing, wherein the control circuitry sets the allowed MPR to be larger in accordance with a larger spacing set to the subcarrier spacing; and transmission circuitry configured to perform a contention-based uplink transmission based on the performed transmission power control.

2. A communication method for a terminal apparatus which communicates with a base station apparatus by using a plurality of subcarriers in at least one of a higher-frequency band and a lower-frequency band, the communication method comprising:

receiving radio resource control (RRC) signaling indicating that contention-based access is supported and including information related to a resource allocation in a unit of a quantity of resource blocks;

acquiring the RRC signaling indicating a subcarrier spacing between the plurality of subcarriers included in an Orthogonal Frequency Division Multiplexing (OFDM) symbol;

setting the subcarrier spacing in the higher-frequency band to be larger than the subcarrier spacing in the lower-frequency bandy;

performing transmission power control based on a value of an allowed maximum power reduction (MPR), the allowed MPR being defined based on at least the subcarrier spacing;

setting the allowed MPR to be larger in accordance with a larger spacing set to the subcarrier spacing; and performing a contention-based uplink transmission based on the performed transmission power control.

* * * * *